US011394889B2

(12) United States Patent
Miyake

(10) Patent No.: US 11,394,889 B2
(45) Date of Patent: Jul. 19, 2022

(54) IMAGE RECOGNITION APPARATUS AND IMAGE RECOGNITION METHOD

(71) Applicant: Panasonic Intellectual Property Management Co., Ltd., Osaka (JP)

(72) Inventor: Yasuo Miyake, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/198,191

(22) Filed: Mar. 10, 2021

(65) Prior Publication Data
US 2021/0195085 A1 Jun. 24, 2021

Related U.S. Application Data

(63) Continuation of application No. PCT/JP2019/039070, filed on Oct. 3, 2019.

(30) Foreign Application Priority Data

Oct. 26, 2018 (JP) .............................. JP2018-202188

(51) Int. Cl.
H04N 5/235 (2006.01)
G06N 3/08 (2006.01)
H04N 5/232 (2006.01)

(52) U.S. Cl.
CPC ............. H04N 5/2353 (2013.01); G06N 3/08 (2013.01); H04N 5/23203 (2013.01); H04N 5/23222 (2013.01); H04N 5/232935 (2018.08)

(58) Field of Classification Search
CPC .......... H04N 5/2353; H04N 5/232935; H04N 5/23203; H04N 5/23222; G06N 3/08
See application file for complete search history.

(56) References Cited

U.S. PATENT DOCUMENTS

| 9,549,125 | B1* | 1/2017 | Goyal | H04N 5/23216 |
| 2008/0232667 | A1 | 9/2008 | Kitamura et al. | |
| 2010/0171837 | A1* | 7/2010 | Pillman | H04N 5/23222 348/187 |
| 2012/0120263 | A1* | 5/2012 | Li | H04N 5/2327 348/208.4 |

(Continued)

FOREIGN PATENT DOCUMENTS

| JP | 7-184098 | 7/1995 |
| JP | 2002-027315 | 1/2002 |

(Continued)

OTHER PUBLICATIONS

International Search Report of PCT application No. PCT/JP2019/039070 dated Nov. 26, 2019.

Primary Examiner — Ahmed A Berhan
(74) Attorney, Agent, or Firm — McDermott Will & Emery LLP

(57) ABSTRACT

An image recognition apparatus includes a processing circuit and a control circuit. The processing circuit receives a first image obtained by performing multiple-exposure image capturing of a first subject. The processing circuit uses the first image to calculate a recognition accuracy of the first subject. The control circuit changes a condition of the multiple-exposure image capturing in a case where the recognition accuracy is lower than a recognition accuracy threshold.

25 Claims, 24 Drawing Sheets

(56) References Cited

U.S. PATENT DOCUMENTS

2018/0020171 A1    1/2018  Miyake et al.
2018/0137375 A1    5/2018  Takemura et al.

FOREIGN PATENT DOCUMENTS

| | | |
|---|---|---|
| JP | 2008-229161 | 10/2008 |
| JP | 2015-192222 | 11/2015 |
| JP | 2017-027220 | 2/2017 |
| WO | 2017/094229 | 6/2017 |
| WO | 2018/003212 | 1/2018 |

* cited by examiner

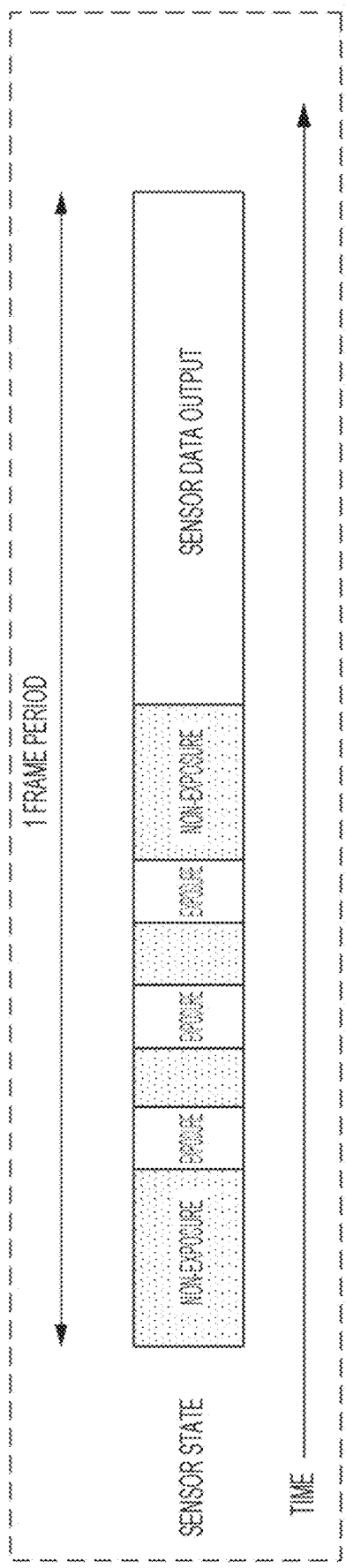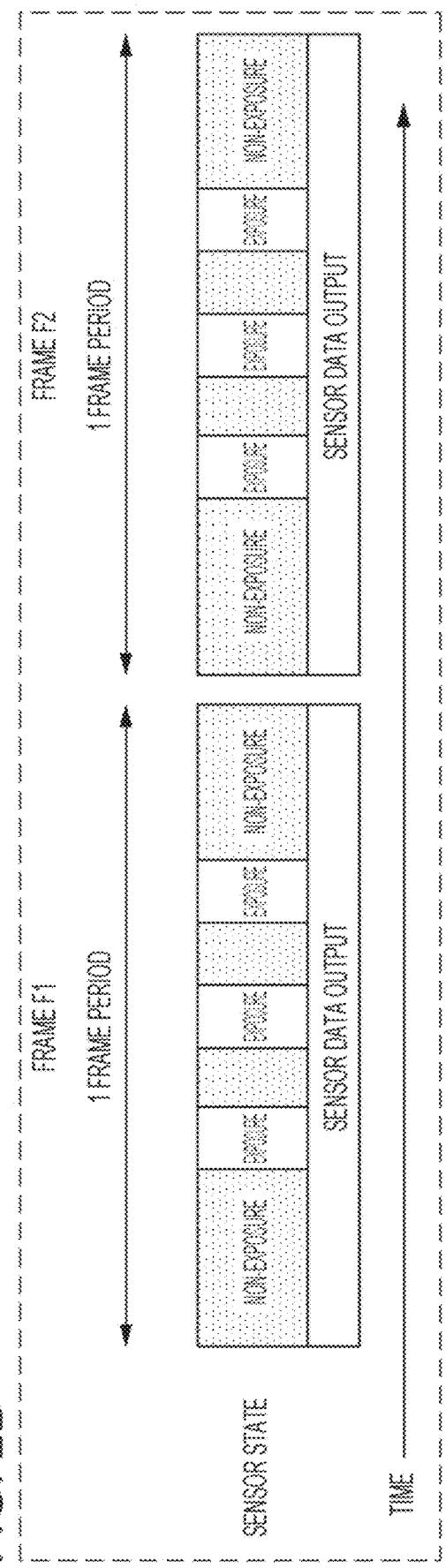

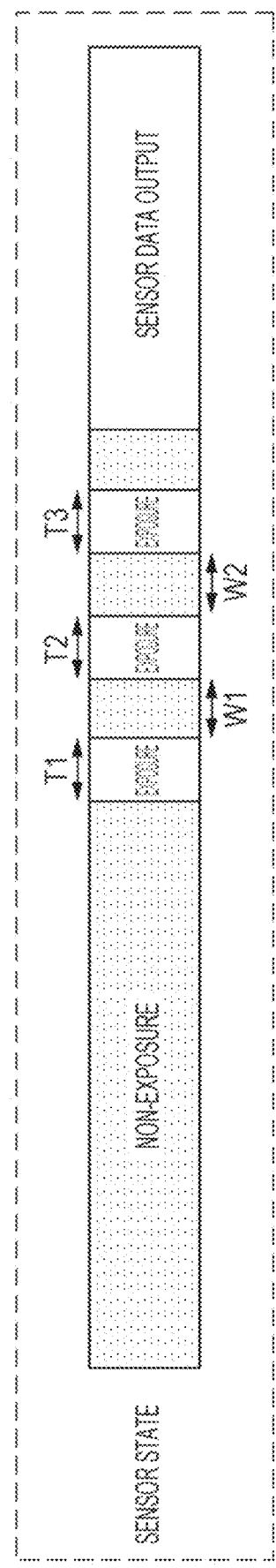

FIG. 7A

|  | FRAME n | FRAME n+α |
|---|---|---|
| NUMBER OF EXPOSURES | 3 | 3 |
| EXPOSURE INTERVAL | 2 ms | 4 ms |
| EXPOSURE WIDTH (TIME) | 1 ms | 1 ms |
| GAIN | 0 dB | 0 dB |
| FRAME RATE | 60 fps | 60 fps |
| ... |  |  |

FIG. 7B

|  | FRAME n | FRAME n+α |
|---|---|---|
| RECOGNITION ACCURACY/AUTOMOBILE | 35% | 85% |
| RECOGNITION ACCURACY/PERSON | NOT RECOGNIZED | NOT RECOGNIZED |
| RECOGNITION ACCURACY/HOUSE | NOT RECOGNIZED | NOT RECOGNIZED |
| RECOGNITION ACCURACY THRESHOLD | 50% | 50% |

FIG. 9A

|  | FRAME n | FRAME n+α |
|---|---|---|
| NUMBER OF EXPOSURES | 3 | 3 |
| EXPOSURE INTERVAL | 2 ms | 4 ms |
| EXPOSURE WIDTH (TIME) | 1 ms | 1 ms |
| GAIN | 0 dB | 0 dB |
| FRAME RATE | 60 fps | 60 fps |
| ... |  |  |

FIG. 9B

|  | PRIORITY LEVEL | FRAME n | FRAME n+α |
|---|---|---|---|
| SECOND RECOGNITION ACCURACY/AUTOMOBILE | 2 | 75% | 30% |
| FIRST RECOGNITION ACCURACY/PERSON | 1 | 40% | 60% |
| THIRD RECOGNITION ACCURACY/HOUSE | 3 | 20% | NOT RECOGNIZED |
| RECOGNITION ACCURACY THRESHOLD | - | 50% | 50% |

FIG. 13A

|  | FRAME n | FRAME n+α |
|---|---|---|
| NUMBER OF EXPOSURES | 3 | 3 |
| EXPOSURE INTERVAL | 2 ms | 4 ms |
| EXPOSURE WIDTH (TIME) | 1 ms | 1 ms |
| GAIN | 0 dB | 0 dB |
| FRAME RATE | 60 fps | 60 fps |
| ... |  |  |

FIG. 13B

|  | FRAME n | FRAME n+α |
|---|---|---|
| SPEED/FIRST SUBJECT | 50±15 km/h | 50±5 km/h |
| ERROR THRESHOLD | 10 km/h | 10 km/h |

FIG. 21A

|  | FRAME n | FRAME n+α |
|---|---|---|
| NUMBER OF EXPOSURES | 3 | 3 |
| EXPOSURE INTERVAL | 2 ms ⇒ | 4 ms |
| EXPOSURE WIDTH (TIME) | 1 ms | 1 ms |
| GAIN | 0 dB | 0 dB |
| FRAME RATE | 60 fps | 60 fps |
| ... |  |  |

FIG. 21B

|  | FRAME n | FRAME n+α |
|---|---|---|
| RELATIVE SPEED/FIRST SUBJECT | 50±15 km/h ⇒ | 50±5 km/h |
| ERROR THRESHOLD | 10 km/h | 10 km/h |

IMAGE RECOGNITION APPARATUS AND IMAGE RECOGNITION METHOD

BACKGROUND

1. Technical Field

The present disclosure relates to an image recognition apparatus and an image recognition method.

2. Description of the Related Art

Currently, apparatuses that perform information processing using images are in widespread use. Such apparatuses can be mounted in various machines. Examples of such machines include autonomous driving vehicles. Examples of such machines also include robots used in factory automation.

Examples of the information processing include recognition of objects present in images. Research and development of algorithms for performing such recognition are ongoing. WO2018/003212A1 describes an example of the algorithms.

SUMMARY

There has been a demand for increasing the accuracy of information processing using images.

In one general aspect, the techniques disclosed here feature an image recognition apparatus including: a processing circuit that receives a first image obtained by performing multiple-exposure image capturing of a first subject and uses the first image to calculate a recognition accuracy of the first subject; and a control circuit that changes a condition of the multiple-exposure image capturing in a case where the recognition accuracy is lower than a recognition accuracy threshold.

The present disclosure provides a technique for increasing the accuracy of information processing using images.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a diagram illustrating a way of multiple-exposure image capturing;

FIG. 2B is a diagram illustrating a way of multiple-exposure image capturing;

FIG. 4A is a diagram illustrating a way of multiple-exposure image capturing;

FIG. 7A is a diagram illustrating a change in conditions of multiple-exposure image capturing;

FIG. 7B is a diagram illustrating a change in recognition accuracies;

FIG. 9A is a diagram illustrating a change in conditions of multiple-exposure image capturing;

FIG. 9B is a diagram illustrating changes in recognition accuracies;

FIG. 13A is a diagram illustrating a change in conditions of multiple-exposure image capturing;

FIG. 13B is a diagram illustrating a change in an error;

FIG. 21A is a diagram illustrating a change in conditions of multiple-exposure image capturing;

FIG. 21B is a diagram illustrating a change in an error; and

DETAILED DESCRIPTION

Figure 1:
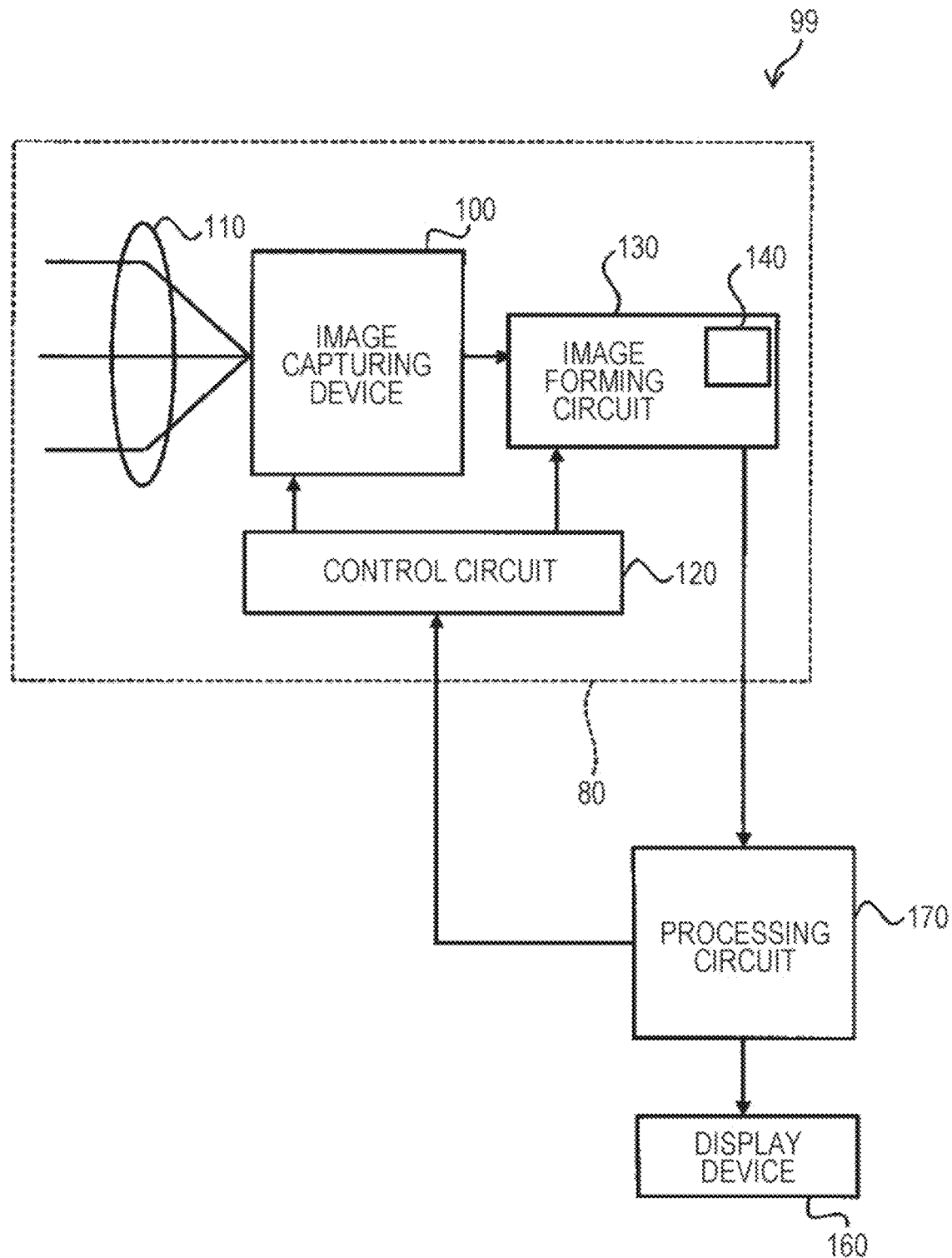
FIG. 1 is a block diagram of an image recognition apparatus.

Underlying Knowledge Forming Basis of the Present Disclosure

WO2018/003212A1 describes example information processing using images. In the information processing described in WO2018/003212A1, an image obtained by performing a single exposure is used.

The present inventor has studied the way of increasing the accuracy of information processing using an image obtained by multiple-exposure image capturing.

Overview of Aspects of the Present Disclosure

An image recognition apparatus according to a first aspect of the present disclosure includes:

a processing circuit that receives a first image obtained by performing multiple-exposure image capturing of a first subject and uses the first image to calculate a recognition accuracy of the first subject; and a control circuit that changes a condition of the multiple-exposure image capturing in a case where the recognition accuracy is lower than a recognition accuracy threshold.

The technique according to the first aspect is suitable for ensuring the accuracy of calculation of the recognition accuracy.

In a second aspect of the present disclosure, for example, in the image recognition apparatus according to the first aspect, the condition that is changed in a case where the recognition accuracy is lower than the recognition accuracy threshold may include at least one selected from the group consisting of (a) a length of each exposure period that is employed when the first image is obtained, (b) a length of each exposure interval that is employed when the first image is obtained, (c) the number of exposures that is employed when the first image is obtained, (d) an exposure sensitivity of the first image, (e) a gain of an image capturing device that is used to obtain the first image, (f) a focal length of the image capturing device that is used to obtain the first image, (g) an aperture of the image capturing device that is used to obtain the first image, and (h) an output resolution of the first image.

The change in the condition according to the second embodiment can contribute to an increase in the recognition accuracy.

In a third aspect of the present disclosure, for example, the image recognition apparatus according to the first or second aspect may further include at least one of an internal display device that displays the recognition accuracy or an output interface for outputting the recognition accuracy to an external display device that displays the recognition accuracy.

According to the third aspect, the recognition accuracy is made visible.

In a fourth aspect of the present disclosure, for example, the image recognition apparatus according to any one of the first to third aspects may further include an image capturing device that is used to obtain the first image.

According to the fourth aspect, the first image can be easily obtained.

In a fifth aspect of the present disclosure, for example, in the image recognition apparatus according to any one of the first to fourth aspects, the condition and the first image may be associated with each other.

According to the fifth aspect, the condition of the multiple-exposure image capturing is easily used as information.

In a sixth aspect of the present disclosure, for example, in the image recognition apparatus according to the fifth aspect, as the condition associated with the first image, the condition that is retained in the control circuit may be used.

In a seventh aspect of the present disclosure, for example, the image recognition apparatus according to the fifth aspect may further include an image capturing device that is used to obtain the first image, and as the condition associated with the first image, the condition that is retained in the image capturing device may be used.

According to both the sixth aspect and the seventh aspect, the condition of the multiple-exposure image capturing and the first image can be appropriately associated with each other.

In an eighth aspect of the present disclosure, for example, in the image recognition apparatus according to any one of the first to seventh aspects, the processing circuit may perform supervised learning using a plurality of combinations of one of teaching images and corresponding one of correct labels, the teaching images each corresponding to the first image, the correct labels each corresponding to an object name of the first subject, and may calculate the recognition accuracy using the first image after the supervised learning.

With the processing circuit according to the eighth aspect, the accuracy of calculation of the recognition accuracy can be ensured.

In a ninth aspect of the present disclosure, for example, the image recognition apparatus according to the eighth aspect may further include a second image capturing device that is used to obtain the teaching images.

With the image capturing device according to the ninth aspect, learning is easily performed.

In a tenth aspect of the present disclosure, for example, in the image recognition apparatus according to the eighth or ninth aspect, the processing circuit may read a computational model expressed by a neural network, and the processing circuit may perform the supervised learning and may calculate the recognition accuracy using the first image after the supervised learning.

The neural network is suitable for information processing using images.

In an eleventh aspect of the present disclosure, for example, in the image recognition apparatus according to any one of the first to tenth aspects, calculation of the recognition accuracy by the processing circuit and changing of the condition by the control circuit in a case where the recognition accuracy is lower than the recognition accuracy threshold may be repeated until an end condition is satisfied.

The eleventh aspect is suitable for attaining a high recognition accuracy.

In a twelfth aspect of the present disclosure, for example, in the image recognition apparatus according to any one of the first to eleventh aspects, the processing circuit may calculate a first recognition accuracy that is the recognition accuracy and that indicates a probability of the first subject being a first object and a second recognition accuracy that indicates a probability of the first subject being a second object, and the control circuit may change the condition of the multiple-exposure image capturing also in a case where a difference obtained by subtracting the second recognition accuracy from the first recognition accuracy is less than or equal to Z, Z being a value greater than or equal to zero.

The image recognition apparatus can be configured such that not only the possibility that a subject in an image is a specific object but also the possibility that the subject is another object can be recognized. The technique according to the twelfth aspect is usable in the image recognition apparatus thus configured.

In a thirteenth aspect of the present disclosure, for example, in the image recognition apparatus according to any one of the first to twelfth aspects, the processing circuit may calculate recognition accuracies for a plurality of first images obtained by using different conditions to thereby calculate a plurality of recognition accuracies for reference, the control circuit may compare the plurality of recognition accuracies for reference with each other and may select a base condition that is the condition served as a base, and the processing circuit may use a first image that is obtained by using the base condition and that is different from the first images used to calculate the plurality of recognition accuracies for reference to calculate the recognition accuracy that is to be compared with the recognition accuracy threshold.

The thirteenth aspect is advantageous from the viewpoint of quickly identifying a condition of the multiple-exposure image capturing with which a higher recognition accuracy is attained.

An image recognition apparatus according to a fourteenth aspect of the present disclosure includes:

a processing circuit that receives a first image obtained by performing multiple-exposure image capturing of a first subject and uses the first image to calculate an estimated range of a speed of the first subject, the estimated range being a range of a value V±an error E; and a control circuit that changes a condition of the multiple-exposure image capturing in a case where the error E is greater than an error threshold.

The technique according to the fourteenth aspect is suitable for ensuring the accuracy of calculation of the speed of the first subject.

An image recognition method according to a fifteenth aspect of the present disclosure includes:

using a first image obtained by performing multiple-exposure image capturing of a first subject to calculate a recognition accuracy of the first subject; and changing a condition of the multiple-exposure image capturing in a case where the recognition accuracy is lower than a recognition accuracy threshold.

The technique according to the fifteenth aspect is suitable for ensuring the accuracy of calculation of the recognition accuracy.

An image recognition method according to a sixteenth aspect of the present disclosure includes:

using a first image obtained by performing multiple-exposure image capturing of a first subject to calculate an estimated range of a speed of the first subject, the estimated range being a range of a value V±an error E; and changing a condition of the multiple-exposure image capturing in a case where the error E is greater than an error threshold.

The technique according to the sixteenth aspect is suitable for ensuring the accuracy of calculation of the speed of the first subject.

An image recognition apparatus according to a seventeenth aspect of the present disclosure is an image recognition apparatus including: a memory; and a processor, in which the processor receives a first image obtained by performing multiple-exposure image capturing of a first subject, uses the first image to calculate a recognition accuracy of the first subject, and changes a condition of the multiple-exposure image capturing in a case where the recognition accuracy is lower than a recognition accuracy threshold.

The technique according to the seventeenth aspect is suitable for ensuring the accuracy of calculation of the recognition accuracy.

An image recognition apparatus according to an eighteenth aspect of the present disclosure is an image recognition apparatus including: a memory; and a processor, in which the processor receives a first image obtained by performing multiple-exposure image capturing of a first subject, uses the first image to calculate an estimated range of a speed of the first subject, the estimated range being a range of a value V±an error E, and changes a condition of the multiple-exposure image capturing in a case where the error E is greater than an error threshold.

The technique according to the eighteenth aspect is suitable for ensuring the accuracy of calculation of the speed of the first subject.

An image recognition apparatus according to a nineteenth aspect of the present disclosure includes:

a processing circuit that receives a first image obtained by performing multiple-exposure image capturing of a first subject and uses the first image to calculate a recognition accuracy of the first subject; and a control circuit that changes a condition of the multiple-exposure image capturing, in which the processing circuit calculates recognition accuracies for a plurality of first images obtained by using different conditions to thereby calculate the plurality of recognition accuracies.

The technique according to the nineteenth aspect is suitable for ensuring the accuracy of calculation of the recognition accuracy.

An image recognition apparatus according to a twentieth aspect of the present disclosure includes:

a processing circuit that receives a first image obtained by performing multiple-exposure image capturing of a first subject and uses the first image to calculate an estimated range of a speed of the first subject, the estimated range being a range of a value V±an error E; and a control circuit that changes a condition of the multiple-exposure image capturing, in which the processing circuit calculates estimated ranges for a plurality of first images obtained by using different conditions to thereby calculate a plurality of errors E.

The technique according to the twentieth aspect is suitable for ensuring the accuracy of calculation of the speed of the first subject.

The techniques for the image recognition apparatus are applicable to the image recognition method. The techniques for the image recognition method are applicable to the image recognition apparatus.

First Embodiment

FIG. 1 illustrates an image recognition apparatus 99 according to a first embodiment. The image recognition apparatus 99 includes an optical system 110, an image capturing device 100, an image forming circuit 130, a control circuit 120, a processing circuit 170, and a display device 160. The image forming circuit 130 includes an output buffer 140.

In the image recognition apparatus 99, a camera unit 80 is configured. The camera unit 80 includes the optical system 110, the image capturing device 100, the image forming circuit 130, and the control circuit 120.

In this embodiment, the optical system 110 includes at least one lens. The control circuit 120 is a system controller.

In the following description, the term "recognition accuracy" may be used. The recognition accuracy is described. In this embodiment, the image recognition apparatus 99 recognizes a subject in an image. In the image recognition apparatus 99, as a numerical value that indicates the accuracy of the recognition, the recognition accuracy is calculated.

Specifically, the image recognition apparatus 99 can perform recognition in such a manner that the image recognition apparatus 99 recognizes the subject as an object Y with a recognition accuracy X. X is a value greater than or equal to 0% and less than or equal to 100%. Y is the object name. Examples of Y include automobile, person, sign, and signal.

Typically, the number of possible values of the recognition accuracy is more than two. The possible values of the recognition accuracy include a value greater than 0% and less than 100%. Typically, in the processing circuit 170, a computer is configured. The recognition accuracy can have any value greater than or equal to 0% and less than or equal to 100% within the range of accuracy of the computer.

Operations of the Components of the Image Recognition Apparatus 99

The image capturing device 100 performs image capturing of a subject through the optical system 110. Specifically, the image capturing device 100 includes an image sensor. The image capturing device 100 uses the image sensor to perform image capturing. The image capturing device 100 outputs a signal representing the specifics of image capturing. This signal corresponds to raw data.

The image forming circuit 130 converts the signal to an image. Specifically, the image forming circuit 130 converts the raw data to image data. Accordingly, the raw data is converted to an image. Image data may be hereinafter simply referred to as an image. The image forming circuit 130 outputs the image to the processing circuit 170 via the output buffer 140.

The image forming circuit 130 may be a circuit that can perform various types of image processing. Examples of the image processing include various types of correction processing and color processing. Examples of the correction processing include dark frame correction and defective pixel correction. Examples of the color processing include white balance processing, color matrix processing, and Bayer interpolation processing. Other types of image processing can be employed. For example, edge enhancement and binarization can contribute to an increase in the recognition accuracy. In a case where image processing is performed, the image forming circuit 130 outputs an image obtained as a result of the image processing to the processing circuit 170 via the output buffer 140.

The processing circuit 170 may be responsible for the image processing. The image recognition apparatus 99 need not include a component that performs image processing.

The processing circuit 170 uses the image to calculate the recognition accuracy. Specifically, the processing circuit 170 recognizes a subject in the image. In other words, the processing circuit 170 identifies the object name of the subject in the image. The processing circuit 170 calculates the recognition accuracy indicating the accuracy of the recognition.

The processing circuit 170 outputs the image, the name of the recognized object, and the recognition accuracy of the recognition to the display device 160. The processing circuit 170 outputs the recognition accuracy to the control circuit 120.

The display device 160 displays the image, the name of the recognized object, and the recognition accuracy of the recognition.

The control circuit 120 controls image capturing conditions of the image capturing device 100. The control circuit 120 controls image forming conditions of the image forming circuit 130.

Multiple-Exposure Image Capturing

The image capturing device 100 can perform multiple-exposure image capturing. When multiple-exposure image capturing is performed, raw data that includes a plurality of images of one subject can be obtained. The image forming circuit 130 can convert the raw data to an image that includes the plurality of images of the one subject. Such an image may be hereinafter referred to as a first image. Such one subject may be referred to as a first subject.

The processing circuit 170 receives the first image obtained by performing multiple-exposure image capturing of the first subject. The processing circuit 170 uses the first image to calculate the recognition accuracy of the first subject. In the first image, both the clearness of the outline of the subject in the image and the sufficiency of motion information included in the image can be achieved more easily than in an image that includes only one image of one subject. Accordingly, the first image is advantageous from the viewpoint of attaining a high recognition accuracy. Specifically, the processing circuit 170 identifies the object name of the first subject in the first image and calculates the recognition accuracy that indicates the accuracy of the recognition.

Reasons why the first image is more advantageous than an image that includes only one image of one subject from the viewpoint of attaining a high recognition accuracy are described below while citing specific examples.

An image that includes only one image of one subject may include motion information. For example, consider a case where image capturing of a traveling car is performed with a long exposure time. In this case, an image of the subject that is blurred to a large degree is obtained. With an image that includes the image of the subject that is blurred to a large degree, it is easy to determine whether the subject is moving. This is because such an image includes motion information about the subject. However, in the image of the subject that is blurred to a large degree, the outline that is characteristic of the subject is blurred. Therefore, it is difficult to determine that the subject corresponding to the image is a car.

Consider a case where image capturing of a traveling car is performed with a short exposure time. In this case, an image of the subject that is blurred to a small degree is obtained. With the image of the subject that is blurred to a small degree, it is easy to obtain a clear outline that is characteristic of the subject. Therefore, it is easy to determine that the subject corresponding to the image is a car. However, with the image of the subject that is blurred to a small degree, it is difficult to determine from the image whether the car is moving. This is because the image thus obtained does not include sufficient motion information about the car that is the subject.

With an image obtained by multiple-exposure image capturing, both the clearness of the outline of the subject in the image and the sufficiency of motion information included in the image can be achieved more easily than with the above-described images. This capability of achieving both is advantageous from the viewpoint of ensuring the accuracy of calculation of the recognition accuracy. Further, the capability of achieving both is also advantageous from the viewpoint of ensuring the accuracy of calculation of the speed of the first subject in a second embodiment described below.

A state where both is achieved by multiple-exposure image capturing is illustrated in the upper part of FIG. 4B, which will be described in detail below. Specifically, in the example illustrated in FIG. 4B, a clear outline of subject C is obtained. This clear outline is characteristic of a car. Therefore, from the image illustrated in FIG. 4B, it is easy to determine that the subject corresponding to the image is a car. The image illustrated in FIG. 4B includes a plurality of images of subject C, and therefore, includes motion information. Accordingly, it is easy to determine that the car that is the subject is traveling. As described above, the capability of easily determining the above-described matters is advantageous from the viewpoint of ensuring the accuracy of calculation of the recognition accuracy and the accuracy of calculation of the speed of the first subject.

In a case where the recognition accuracy is lower than a recognition accuracy threshold, the control circuit 120 changes a condition of multiple-exposure image capturing. This change can contribute to an increase in the recognition accuracy. The recognition accuracy threshold is a specific value within a range of, for example, 10% or more and 70% or less.

As understood from the above description, the processing circuit 170 and the control circuit 120 have configurations suitable for increasing the accuracy of calculation of the recognition accuracy. Further, operations of the processing circuit 170 and the control circuit 120 do not involve an excessive computational load. Accordingly, with the technique of this embodiment, both suppression of a computational load and an increase in the accuracy of calculation of the recognition accuracy can be attained.

Specifically, in this embodiment, in a case where a condition of multiple-exposure image capturing has been changed, the processing circuit 170 receives the first image that reflects the change. The processing circuit 170 uses the first image to recalculate the recognition accuracy.

More specifically, in this embodiment, calculation of the recognition accuracy by the processing circuit 170 and changing of a condition by the control circuit 120 in a case where the recognition accuracy is lower than the recognition accuracy threshold are repeated until an end condition is satisfied.

The form in which a condition of multiple-exposure image capturing is changed is not specifically limited. For example, there may be a case where the image capturing device 100 includes a register. In this case, the control circuit 120 can write a condition to the register. This writing can be performed through, for example, serial communication.

A condition of multiple-exposure image capturing that is changed in a case where the recognition accuracy is lower than the recognition accuracy threshold includes, for example, at least one selected from the group consisting of condition (a), condition (b), condition (c), condition (d), condition (e), condition (f), condition (g), and condition (h). Condition (a) is the length of each exposure period that is employed when the first image is obtained. Condition (b) is the length of each exposure interval that is employed when the first image is obtained. An exposure interval corresponds to a non-exposure period between exposure periods. Condition (c) is the number of exposures that is employed when the first image is obtained. Condition (d) is the exposure sensitivity of the first image. Condition (e) is a gain of the image capturing device 100 that is used to obtain the first image. Condition (f) is a focal length of the image capturing device 100 that is used to obtain the first image. Condition (g) is an aperture of the image capturing device 100 that is used to obtain the first image. Condition (h) is the output resolution of the first image. Changes in these conditions can contribute to an increase in the recognition accuracy.

In the example illustrated in FIG. 1, the display device 160 is an internal display device of the image recognition apparatus 99. That is, the image recognition apparatus 99 includes the internal display device that displays the recognition accuracy. Specifically, the internal display device can display the first image, the name of the recognized object, and the recognition accuracy of the recognition.

However, the image recognition apparatus 99 may include an output interface for outputting the recognition accuracy to an external display device that displays the recognition accuracy. Specifically, the image recognition apparatus 99 may include an output interface for outputting to an external display device the first image, the name of the recognized object, and the recognition accuracy of the recognition. The external display device may be a device that displays the first image, the name of the recognized object, and the recognition accuracy of the recognition.

The image recognition apparatus 99 may include either the internal display device or the output interface. The image recognition apparatus 99 may include both of them.

In this embodiment, a condition of multiple-exposure image capturing and the first image are associated with each other. Accordingly, it is easy to use the condition of multiple-exposure image capturing as information. This association is performed, for example, after the first image has been obtained.

For example, the display device 160 superimposes and displays, on the first image, a condition of multiple-exposure image capturing used when the first image is obtained by multiple-exposure image capturing. This superimposition corresponds to association of a condition of multiple-exposure image capturing with the first image. For example, information indicating that a condition of multiple-exposure image capturing used when the first image is obtained by multiple-exposure image capturing corresponds to the first image is stored in a text file format. This storage also corresponds to association of a condition of multiple-exposure image capturing with the first image.

For example, as a condition that is associated with the first image, a condition retained in the control circuit 120 is used.

For example, the image recognition apparatus 99 includes the image capturing device 100 that is used to obtain the first image. As a condition that is associated with the first image, a condition retained in the image capturing device 100 is used.

A specific form of multiple-exposure image capturing is described with reference to FIG. 2A, FIG. 2B, and FIG. 2C.

FIG. 2A and FIG. 2B illustrate a form in which a plurality of exposure periods are present in one frame period. In this form, an exposure operation is performed a plurality of times during one frame period. Thereafter, signals obtained by exposures are read. "Sensor data output" in FIG. 2A and FIG. 2B corresponds to this reading. The form illustrated in FIG. 2A and FIG. 2B can be implemented in a case where the image sensor of the image capturing device 100 has the global shutter function.

Specifically, the form illustrated in FIG. 2A can be implemented in a case where the image capturing device 100 includes an image sensor that serially performs exposure and reading. In this form, a non-exposure period and an exposure period alternately appear in one frame period, and thereafter, signals obtained by the plurality of exposures are read. In this embodiment, the form illustrated in FIG. 2A is employed.

The form illustrated in FIG. 2B can be implemented in a case where the image capturing device 100 includes an image sensor that simultaneously performs exposure and reading. In FIG. 2B, frame F1 is followed by frame F2. In one frame period of frame F1, a non-exposure period and an exposure period alternately appear. Signals obtained by the plurality of exposures are read in frame F2. Accordingly, in this form, a non-exposure period and an exposure period alternately appear in a certain frame, and signals obtained by the exposures are read in the subsequent frame.

Multiple-exposure image capturing and the global shutter function can be implemented by, for example, an image capturing device of a multilayer type in which a photoelectric conversion film is sandwiched between a pixel electrode and a counter electrode. For example, when a voltage to be applied to the counter electrode is controlled in such an image capturing device of a multilayer type, an exposure period and a non-exposure period can be set. For a specific example of an image capturing device of a multilayer type, refer to, for example, WO2017/094229A1.

In the image recognition apparatus 99 according to a modification, the image capturing device 100 does not have the global shutter function. The image recognition apparatus 99 thus configured can also obtain the first image by performing multiple-exposure image capturing of the first subject. Specifically, the image forming circuit 130 according to this modification includes a frame memory 151 and a frame adding circuit 152 as illustrated in FIG. 2C. In this modification, in the image capturing device 100, data obtained by the image sensor is output to the frame memory 151. This one piece of output data includes only one image of one subject. In the frame memory 151, a plurality of pieces of output data are accumulated. The frame adding circuit 152 performs frame addition of the plurality of pieces of output data. Accordingly, a pseudo multiple-exposure image is obtained.

It is assumed herein that such a pseudo multiple-exposure image is an example of the first image described above. Even in a case where a pseudo multiple-exposure image is obtained, it is considered that multiple-exposure image capturing of the first subject is performed. Specifically, in this case, it is considered that the image capturing device 100 cooperates with the image forming circuit 130 to perform multiple-exposure image capturing of the first subject. Further, the expression "employed when the first image is obtained" is an expression that covers both a case of employment by the image capturing device 100 and a case of employment by the image forming circuit 130.

Figure 2C:
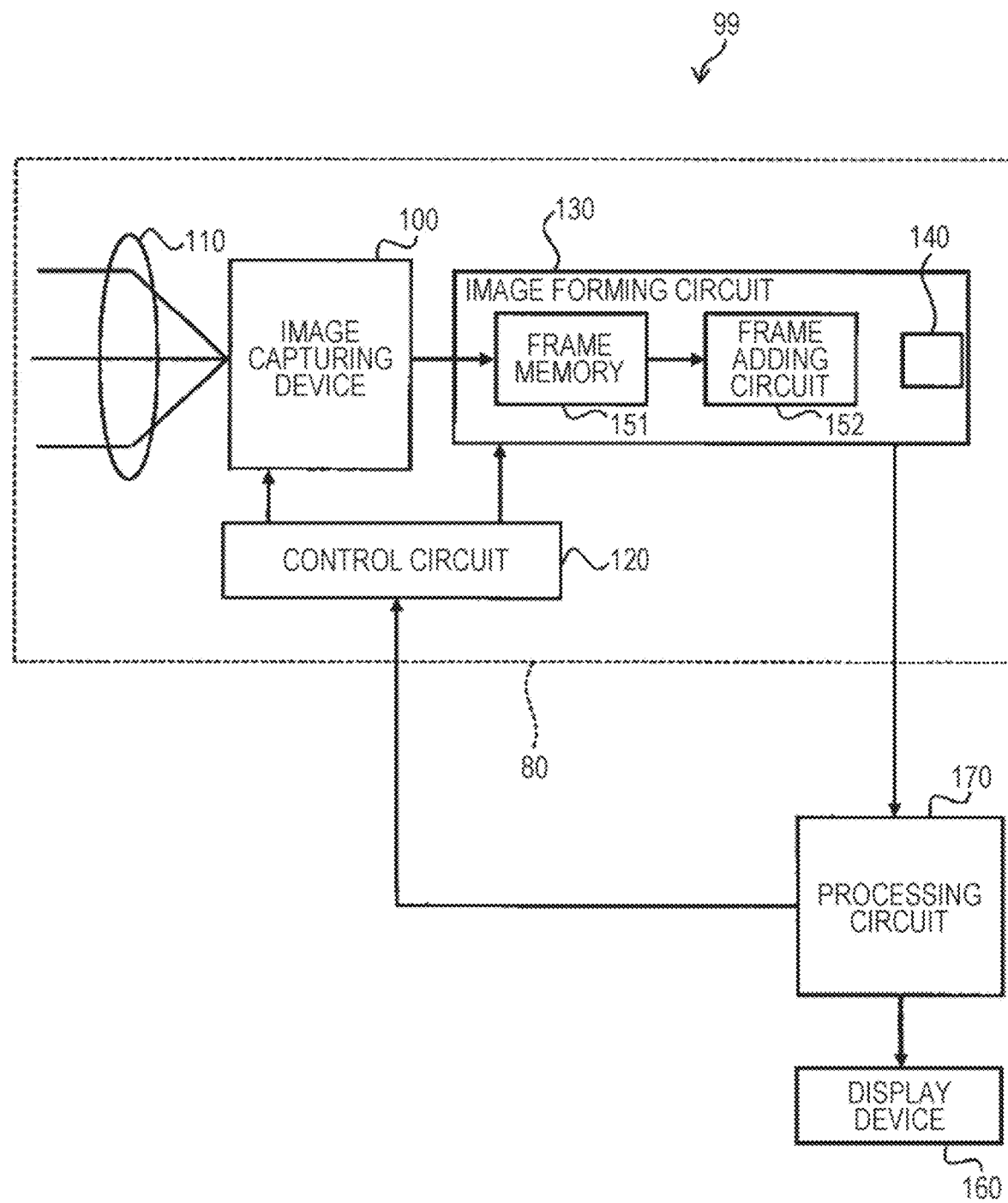
FIG. 2C is a block diagram of the image recognition apparatus.

Conditions of multiple-exposure image capturing are set for the image capturing device 100 in the examples illustrated in FIG. 2A and FIG. 2B. In the example illustrated in FIG. 2C, the setting is performed for the image capturing device 100 and the image forming circuit 130.

Images obtained by multiple-exposure image capturing are described with reference to FIG. 3, FIG. 4A, FIG. 4B, FIG. 5A, and FIG. 5B.

Figure 3:
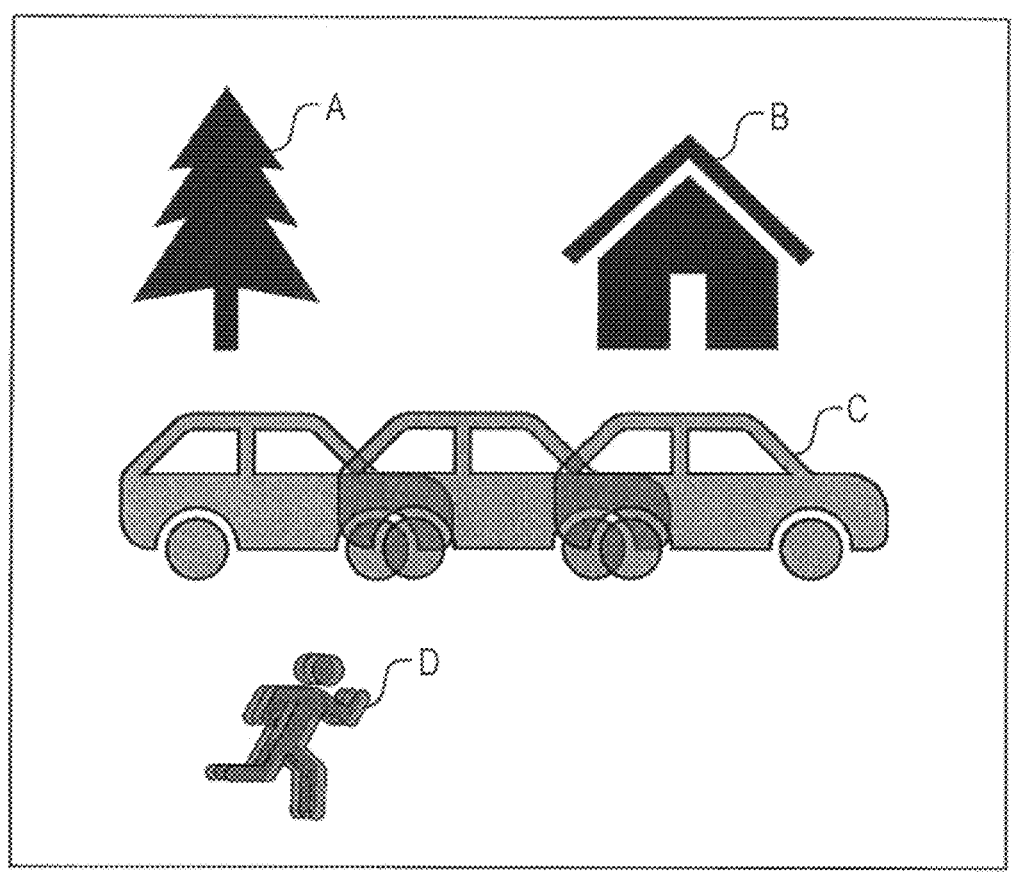
FIG. 3 is a diagram illustrating an image obtained by multiple-exposure image capturing.

FIG. 3 illustrates an example image obtained by multiple-exposure image capturing. In the image illustrated in FIG. 3, subject A, subject B, subject C, and subject D are present.

Subject A and subject B are stationary subjects. In a case where an image of a stationary subject is obtained by multiple-exposure image capturing and in a case where an image of the stationary subject is obtained by usual-exposure image capturing, when the total exposure time of multiple-exposure image capturing and that of usual-exposure image capturing are different, the brightness values are different. However, any other significant difference in appearance is not seen. In the example illustrated in FIG. 3, subject A is a tree and subject B is a house.

Subject C and subject D are moving subjects. When multiple-exposure image capturing of a moving subject is performed, a plurality of images of the subject are present while displaced from each other. Subject C is a fast moving subject. There is a large displacement between the images of subject C. Subject D is a slowly moving subject. There is a small displacement between the images of subject D. In the example illustrated in FIG. 3, subject C is a car and subject D is a person.

Multiple-exposure image capturing of subject C is further described with reference to FIG. 4A and FIG. 4B.

FIG. 4A illustrates a state where the form illustrated in FIG. 2A is employed in multiple-exposure image capturing of subject C. In the specific example illustrated in FIG. 4A, exposure periods T1, T2, and T3 are present in this order. FIG. 4A illustrates exposure intervals W1 and W2. As illustrated, an exposure interval corresponds to a non-exposure period between exposure periods.

Figure 4B:
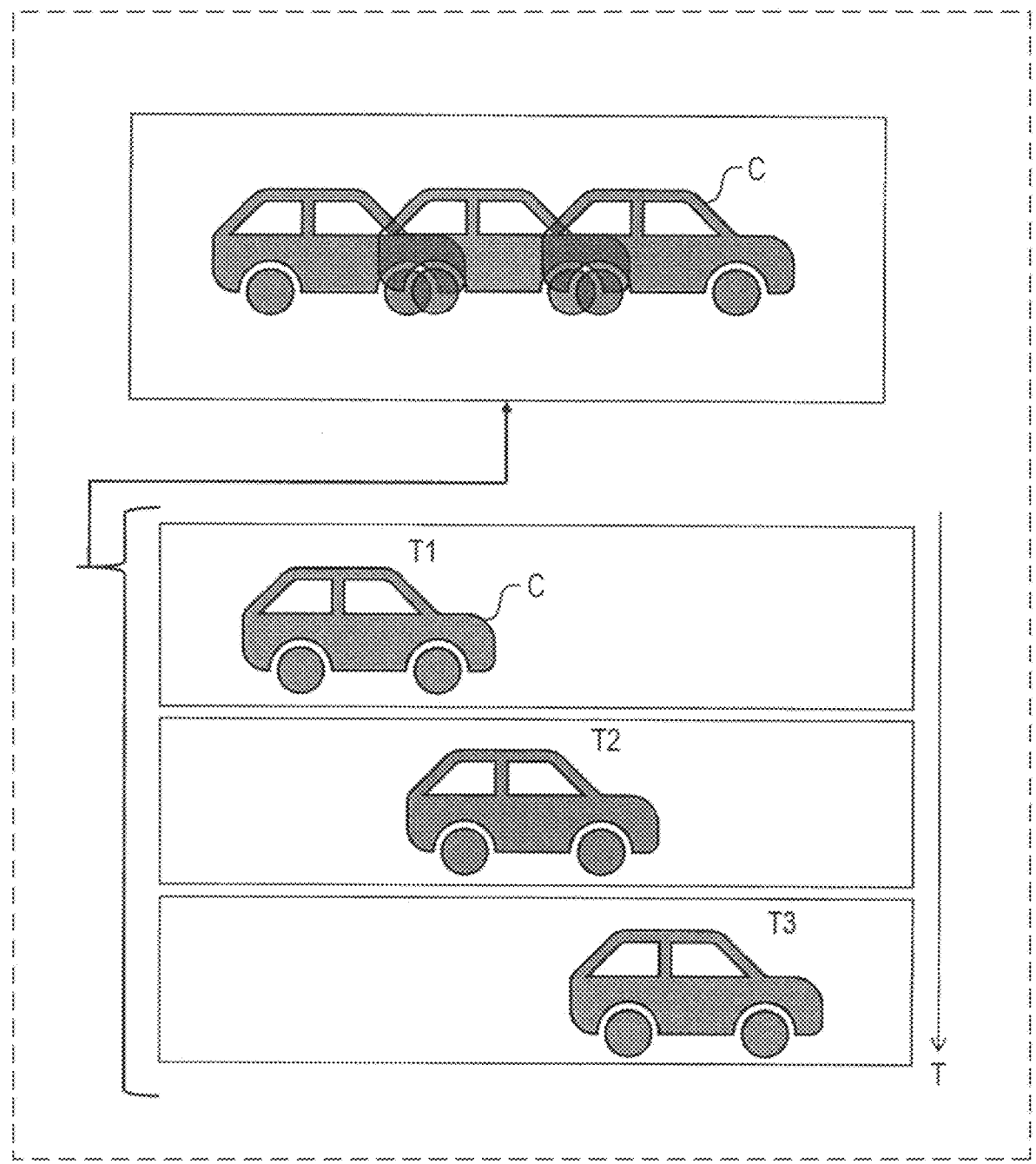
FIG. 4B is a diagram illustrating images obtained by multiple-exposure image capturing.

In the lower part of FIG. 4B, an image of subject C obtained in exposure period T1, an image of subject C obtained in exposure period T2, and an image of subject C obtained in exposure period T3 are illustrated. When these images are superimposed, a multiple-exposure image illustrated in the upper part of FIG. 4B is obtained. The obtained multiple-exposure image can be output from the image sensor.

A relationship between the exposure interval and the obtained multiple-exposure image is described with reference to FIG. 5A and FIG. 5B.

Figure 5A:
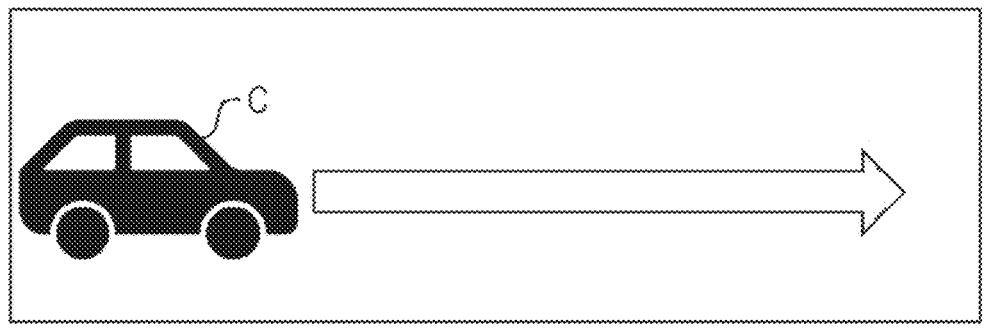
FIG. 5A is a diagram illustrating the direction of travel of a subject.
Figure 5B:
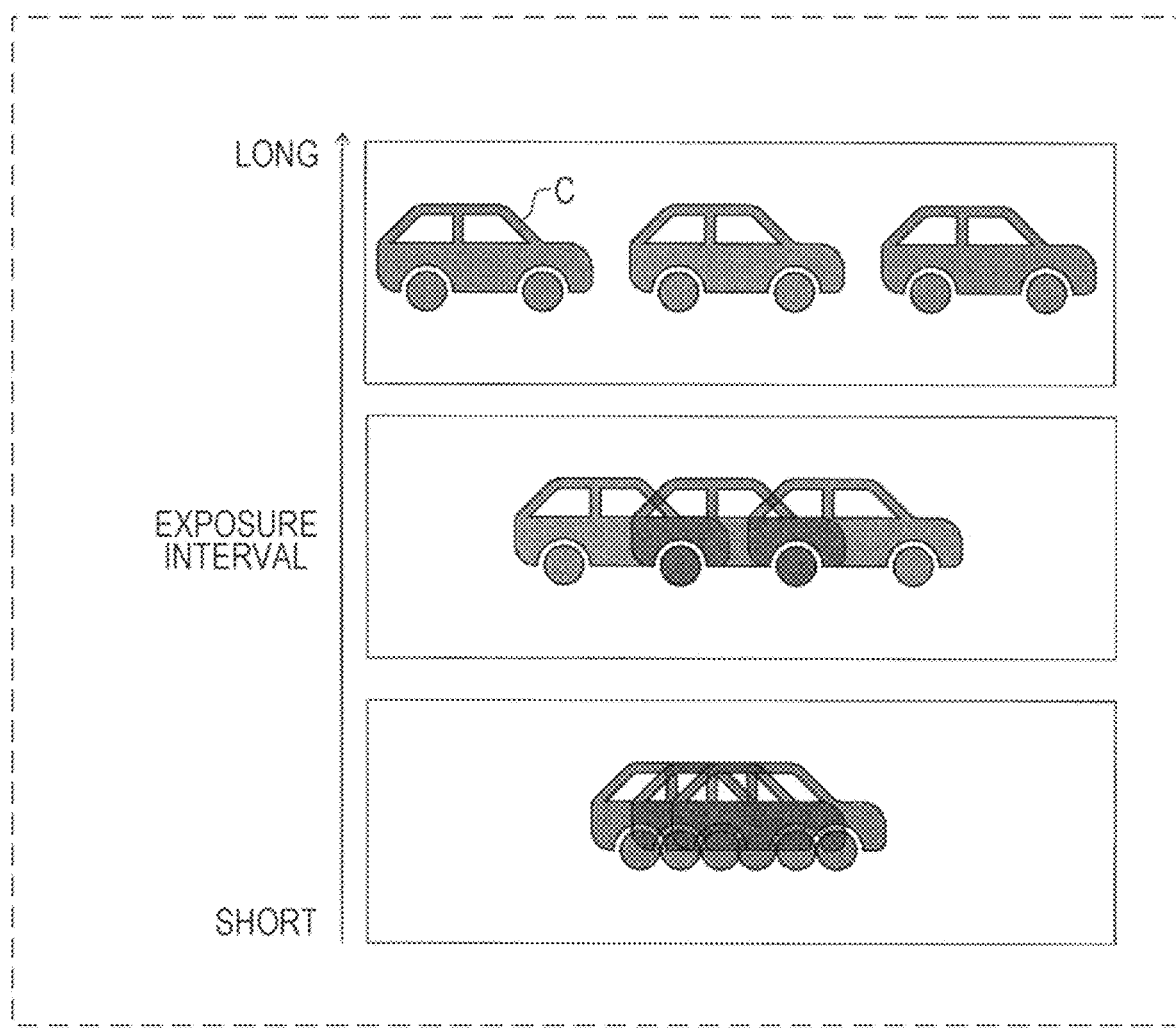
FIG. 5B is a diagram illustrating images obtained by multiple-exposure image capturing.

The block arrow in FIG. 5A indicates the direction of travel of subject C. FIG. 5B illustrates images in a case where subject C is moving in the direction of travel. The image on the upper side of FIG. 5B is a multiple-exposure image obtained in a case where the exposure interval is long. In this case, the displacement between the images of subject C is large. The image on the lower side of FIG. 5B is a multiple-exposure image obtained in a case where the exposure interval is short. In this case, the displacement between the images of subject C is small. The amount of displacement between the images of subject C changes in accordance with the exposure interval.

Figure 6:
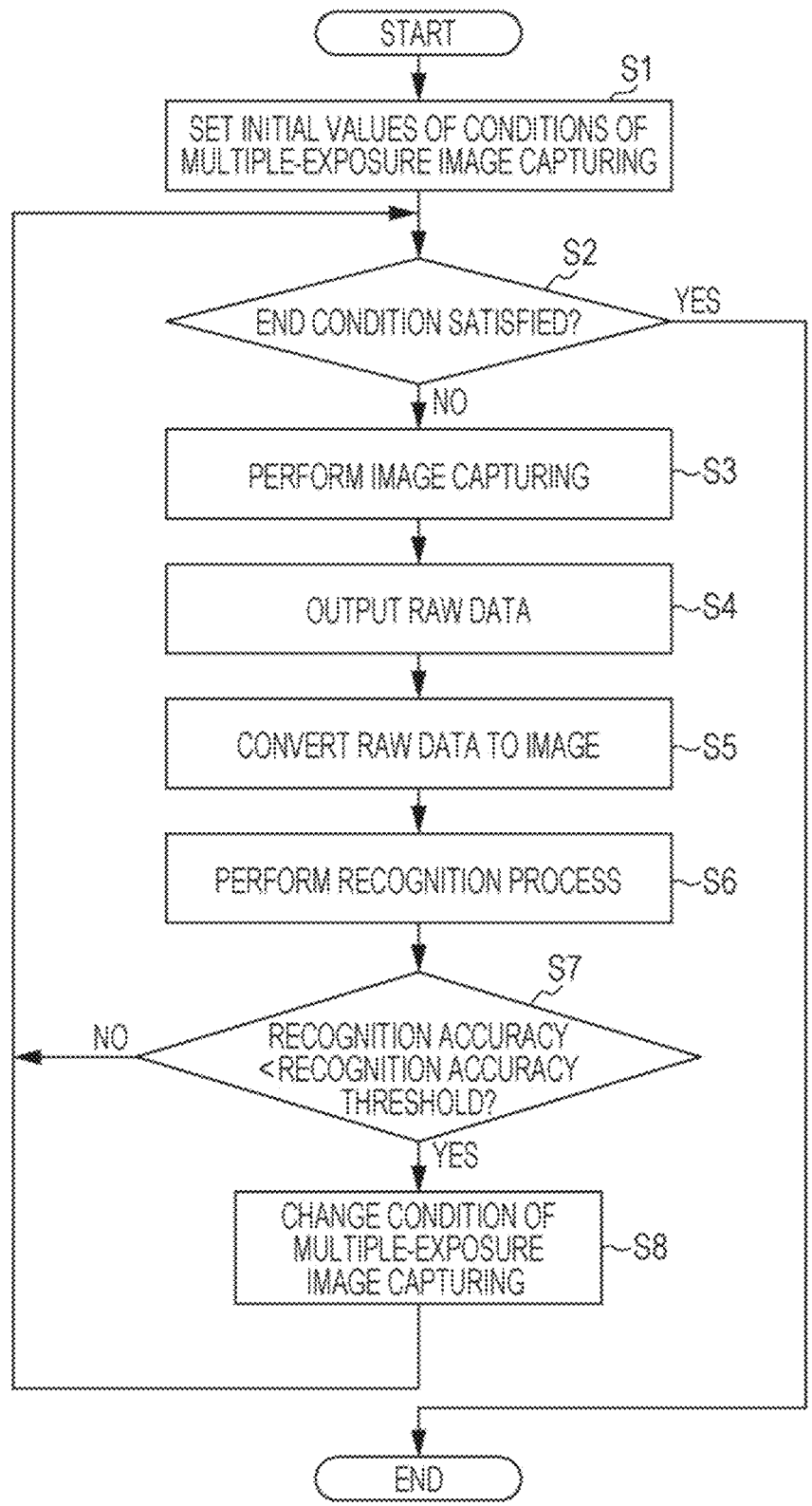
FIG. 6 is a flowchart illustrating control by the image recognition apparatus.

A Specific Example of the Way of Changing a Condition of Multiple-Exposure Image Capturing A condition of multiple-exposure image capturing can be changed in accordance with the flowchart illustrated in FIG. 6.

In step S1, the initial values of conditions of multiple-exposure image capturing are set. This setting can be performed by the control circuit 120. After step S1, the flow proceeds to step S2.

In step S2, it is determined whether an end condition is satisfied. This determination is performed by, for example, the control circuit 120. Specific examples of the end condition will be described below. In a case where the end condition is satisfied, the flow ends. In a case where the end condition is not satisfied, the flow proceeds to step S3.

In step S3, image capturing is performed by the image capturing device 100. Image capturing is performed in accordance with the set conditions of multiple-exposure image capturing. After step S3, the flow proceeds to step S4.

In step S4, raw data is output to the image forming circuit 130 from the image capturing device 100. The raw data represents the specifics of image capturing in step S3. After step S4, the flow proceeds to step S5.

In step S5, the raw data is converted to an image by the image forming circuit 130. The image forming circuit 130 outputs obtained image data to the processing circuit 170. After step S5, the flow proceeds to step S6.

In step S6, a recognition process is performed by the processing circuit 170. In the recognition process, a subject included in the image is recognized. The image used in recognition may be the first image obtained by performing multiple-exposure image capturing of the first subject described above. In this case, the processing circuit 170 uses the first image to calculate the recognition accuracy of the first subject. The processing circuit 170 outputs the recognition accuracy to the control circuit 120. Specifically, the processing circuit 170 identifies the object name of the first subject in the first image and calculates the recognition accuracy that indicates the accuracy of the recognition. The processing circuit 170 outputs the recognition accuracy to the control circuit 120. After step S6, the flow proceeds to step S7.

In step S7, the control circuit 120 determines whether the recognition accuracy is lower than a recognition accuracy threshold. In a case where the recognition accuracy is lower than the recognition accuracy threshold, the flow proceeds to step S8. In a case where the recognition accuracy is higher than or equal to the recognition accuracy threshold, the flow returns to step S2.

In step S8, a condition of multiple-exposure image capturing is changed by the control circuit 120. After step S8, the flow returns to step S2.

A first example of the end condition in step S2 is a condition that an end command is input from outside the image recognition apparatus 99. In a case where an end command is input, the flow ends. In a case where an end command is not input, the flow proceeds to step S3.

A second example of the end condition in step S2 is a condition that a command for turning the power of the image recognition apparatus 99 off is input. In a case where this command is input, the flow ends. In a case where the command is not input, the flow proceeds to step S3.

A third example of the end condition in step S2 is a condition that the recognition accuracy calculated most recently in step S6 is higher than a first upper threshold. In a case where the recognition accuracy is higher than the first upper threshold, the flow ends. In a case where the recognition accuracy is lower than or equal to the first upper threshold, the flow proceeds to step S3. Typically, the first upper threshold is higher than the recognition accuracy threshold.

A fourth example of the end condition in step S2 is a condition that the recognition accuracy calculated most recently in step S6 is lower than a first lower threshold. In a case where the recognition accuracy is lower than the first lower threshold, the flow ends. In a case where the recognition accuracy is higher than or equal to the first lower threshold, the flow proceeds to step S3. Typically, the first lower threshold is lower than the recognition accuracy threshold.

The flow may end in a case where the third example condition or the fourth example condition is satisfied. Otherwise, the flow may proceed to step S3.

A fifth example of the end condition in step S2 is a condition that a situation where the recognition accuracy calculated in step S6 is higher than the first upper threshold is successively determined a first threshold number of times. In a case where this situation is successively determined the first threshold number of times, the flow ends. Otherwise, the flow proceeds to step S3. This condition can be considered to be a condition that a frame that leads to the above-described situation successively appears the first threshold number of times.

A sixth example of the end condition in step S2 is a condition that a situation where the recognition accuracy calculated in step S6 is lower than the first lower threshold is successively determined a second threshold number of times. In a case where this situation is successively determined the second threshold number of times, the flow ends. Otherwise, the flow proceeds to step S3. This condition can be considered to be a condition that a frame that leads to the above-described situation successively appears the second threshold number of times.

The flow may end in a case where the fifth example condition or the sixth example condition is satisfied. Otherwise, the flow may proceed to step S3. In this case, the first threshold number of times and the second threshold number of times may be the same or may be different from each other.

A seventh example of the end condition in step S2 is a condition that image capturing in step S3 has been performed a third threshold number of times since "start" in FIG. 6. In a case where image capturing in step S3 has been performed the third threshold number of times, the flow ends. Otherwise, the flow proceeds to step S3. This condition can be considered to be a condition that a frame has been generated the third threshold number of times since "start" in FIG. 6.

The flowchart illustrated in FIG. 6 can be modified. For example, in a case where a pseudo multiple-exposure image is formed as described with reference to FIG. 2C, the flowchart illustrated in FIG. 6 can be modified so as to perform frame addition.

A change in a condition of multiple-exposure image capturing according to the flowchart illustrated in FIG. 6 can increase the recognition accuracy. This is described with reference to FIG. 7A and FIG. 7B. The example illustrated in FIG. 7A and FIG. 7B assumes that the above-described condition to be changed is the exposure interval.

FIG. 7A illustrates conditions of multiple-exposure image capturing for frame n and conditions of multiple-exposure image capturing for frame n+α, where n and a are natural numbers. FIG. 7A indicates that the exposure interval is changed from 2 ms to 4 ms in accordance with the flowchart illustrated in FIG. 6.

FIG. 7B illustrates recognition accuracies for frame n and recognition accuracies for frame n+α. The example illustrated in FIG. 7B assumes that the first subject is an automobile. FIG. 7B indicates that the recognition accuracy of the first subject increases in accordance with the flowchart illustrated in FIG. 6. Specifically, FIG. 7B illustrates a case where the first subject in the first image is recognized as an automobile and the recognition accuracy indicating the accuracy of the recognition increases from 35% to 85%.

In the example illustrated in FIG. 7A and FIG. 7B, in a case where the recognition accuracy is lower than the recognition accuracy threshold in step S7, the exposure interval is made longer. In actuality, the recognition accuracy may increase when the exposure interval is made longer. However, the recognition accuracy may increase when the exposure interval is made shorter.

This can be generalized in a case where a certain condition of multiple-exposure image capturing is represented by a numerical value. In a case where the recognition accuracy is lower than the recognition accuracy threshold in step S7, the numerical value may be increased or decreased. In a case where the recognition accuracy increases as the numerical value is changed in a direction in which the numerical value is increased or decreased, the numerical value can be changed in the direction until the recognition accuracy becomes higher than or equal to the recognition accuracy threshold. In a case where the recognition accuracy decreases as the numerical value is changed in the direction, the numerical value can be changed in the opposite direction. In a case where the recognition accuracy increases as the numerical value is changed in the opposite direction, the numerical value can be changed in the opposite direction until the recognition accuracy becomes higher than or equal to the recognition accuracy threshold.

The recognition accuracy may increase as the above-described numerical value is increased or decreased. However, typically, an optimum value for increasing the recognition accuracy is present for the above-described numerical value. In this typical case, when the numerical value is changed in a certain direction, the recognition accuracy that is increasing declines when the numerical value crosses the optimum value. When an approximate numerical value at the time when the numerical value crosses the optimum value is employed, the recognition accuracy can have a value close to a local maxima.

When a condition of multiple-exposure image capturing is changed in accordance with the flowchart illustrated in FIG. 6, the recognition accuracy changes. An example form of changes is described with reference to FIG. 8. The example illustrated in FIG. 8 assumes that the above-described condition to be changed is the exposure interval.

Figure 8:
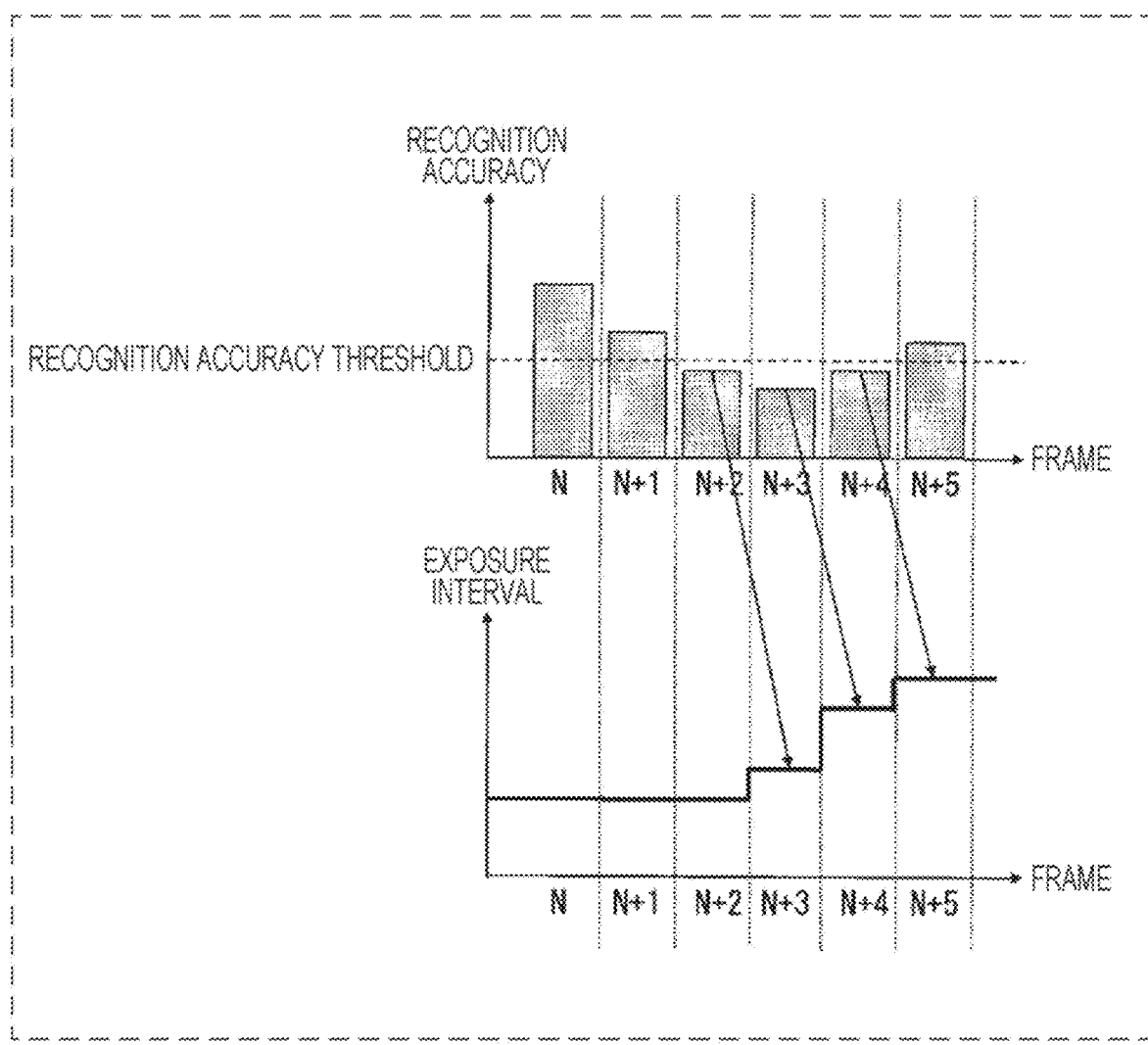
FIG. 8 is a diagram illustrating changes in an exposure interval and in a recognition accuracy.

In the example illustrated in FIG. 8, in step S7 for frame N, it is determined that the recognition accuracy is higher than or equal to the recognition accuracy threshold. Accordingly, the exposure interval for frame N is maintained for the subsequent frame N+1.

In step S7 for frame N+1, it is determined that the recognition accuracy is higher than or equal to the recognition accuracy threshold. Accordingly, the exposure interval for frame N+1 is maintained for the subsequent frame N+2.

In step S7 for frame N+2, it is determined that the recognition accuracy is lower than the recognition accuracy threshold. Accordingly, an exposure interval longer than the exposure interval for frame N+2 is employed for the subsequent frame N+3.

In step S7 for frame N+3, it is determined that the recognition accuracy is lower than the recognition accuracy threshold. Accordingly, an exposure interval longer than the exposure interval for frame N+3 is employed for the subsequent frame N+4.

In step S7 for frame N+4, it is determined that the recognition accuracy is lower than the recognition accuracy threshold. Accordingly, an exposure interval longer than the exposure interval for frame N+4 is employed for the subsequent frame N+5.

In the example illustrated in FIG. 8, for frame N+5, an exposure interval longer than that for frame N+4 is employed. As a result, the recognition accuracy exceeds the recognition accuracy threshold.

A Technique Usable by an Image Recognition Apparatus that can Recognize not Only the Possibility that a Subject in an Image is a Specific Object but Also the Possibility that the Subject is Another Object In the example illustrated in FIG. 7A and FIG. 7B, the possibility that a subject in an image is an automobile is recognized. On the other hand, the possibility that the subject in the image is a person or the possibility that the subject is a house is not recognized. That is, in the example illustrated in FIG. 7A and FIG. 7B, only the possibility that the subject in the image is a specific object is recognized. However, in actuality, not only the possibility that a subject in an image is a specific object but also the possibility that the subject is another object can be recognized. A technique usable in such a case is described below. In the following description, descriptions of matters already given with reference to FIG. 6, FIG. 7A, FIG. 7B, and FIG. 8 may be omitted.

In the following description, terms, namely, a first recognition accuracy, a second recognition accuracy, and a third recognition accuracy, may be used. The first recognition accuracy indicates the probability of the first subject being a first object. The first recognition accuracy corresponds to the recognition accuracy in the flowchart illustrated in FIG. 6. The second recognition accuracy indicates the probability of the first subject being a second object. The third recognition accuracy indicates the probability of the first subject being a third object. The first object is an object having a priority level of 1. The second object is an object having a priority level of 2. The third object is an object having a priority level of 3. The smaller the numerical value of the priority level is, the higher the priority level is. That is, the first object has the highest priority level among these objects.

Consider a case where the first recognition accuracy, the second recognition accuracy, and the third recognition accuracy are calculated and the first recognition accuracy is not highest among these recognition accuracies. In this case, a condition of multiple-exposure image capturing is changed such that the first recognition accuracy is highest among the first recognition accuracy, the second recognition accuracy, and the third recognition accuracy.

This technique is described with reference to FIG. 9A and FIG. 9B while citing a specific example. In the specific example illustrated in FIG. 9A and FIG. 9B, the first object is a person, the second object is an automobile, and the third object is a house. The first recognition accuracy indicates the probability of the first subject being a person. The second recognition accuracy indicates the probability of the first subject being an automobile. The third recognition accuracy indicates the probability of the first subject being a house. In the specific example, the exposure interval is employed as a condition of multiple-exposure image capturing to be changed.

FIG. 9A illustrates conditions of multiple-exposure image capturing for frame n and conditions of multiple-exposure image capturing for frame n+α, where n and a are natural numbers. FIG. 9A indicates that the exposure interval is changed from 2 ms to 4 ms.

FIG. 9B illustrates recognition accuracies for frame n and recognition accuracies for frame n+α. For frame n, the first recognition accuracy is 40%, the second recognition accuracy is 75%, and the third recognition accuracy is 20%. The first recognition accuracy is higher than the third recognition accuracy but the first recognition accuracy is lower than the second recognition accuracy.

Accordingly, the exposure interval is changed such that the first recognition accuracy is highest among the first recognition accuracy, the second recognition accuracy, and the third recognition accuracy. As a result of this change, the first recognition accuracy becomes highest among the first recognition accuracy, the second recognition accuracy, and the third recognition accuracy for frame n+α. Specifically, the first recognition accuracy is 60% and the second recognition accuracy is 30%. Regarding the third recognition accuracy, "not recognized" is indicated. "Not recognized" can be treated as 0%.

In the above description, the case where the possibility that a subject in an image is the first object, the possibility that the subject is the second object, and the possibility that the subject is the third object are recognized has been described. However, the number of objects to be recognized as candidates for a correct object may be two or four or more.

For example, the processing circuit 170 can be configured so as to calculate the first recognition accuracy that is the recognition accuracy described above and that indicates the probability of the first subject being the first object and to calculate the second recognition accuracy that indicates the probability of the first subject being the second object. Also in a case where a difference obtained by subtracting the second recognition accuracy from the first recognition accuracy is less than or equal to Z, the control circuit 120 can change a condition of multiple-exposure image capturing. Here, Z is a value greater than or equal to zero. The processing circuit 170 and the control circuit 120 thus configured are suitable for implementing the above-described technique.

Z may be a value greater than zero, namely, a value within a range of, for example, 10% or more and 20% or less. Accordingly, the first recognition accuracy can be made higher than the second recognition accuracy. When the first recognition accuracy and the second recognition accuracy are set so as to have a significant difference therebetween, the reliability of recognition can be increased.

There is a case where not only the possibility that a subject in an image is a specific object but also the possibility that the subject is another object can be recognized. A technique usable in such a case is not limited to the technique in which the priority levels are set. For example, a higher one of the first obtained first recognition accuracy or the first obtained second recognition accuracy may be associated with the recognition accuracy in the flowchart illustrated in FIG. 6. More generally, a case is assumed where a plurality of candidates for the object name of a certain first subject are first obtained with recognition accuracies indicating their accuracies. In this case, a highest one among the plurality of recognition accuracies can be associated with the recognition accuracy of the first subject in the flowchart illustrated in FIG. 6.

A Specific Example of the Processing Circuit 170

In a specific example, the processing circuit 170 performs supervised learning using a plurality of combinations of one of teaching images and corresponding one of correct labels. A teaching image corresponds to the first image. A correct label corresponds to the object name of the first subject. As described above, examples of the object name include automobile, person, and house. The processing circuit 170 calculates the recognition accuracy using the first image after supervised learning. With the processing circuit 170 thus configured, the accuracy of calculation of the recognition accuracy can be ensured.

In this embodiment, the image recognition apparatus 99 includes the image capturing device 100 that is used to obtain the first image. This image capturing device may be hereinafter referred to as a first image capturing device. The image recognition apparatus 99 includes a second image capturing device that is used to obtain teaching images. In this embodiment, the second image capturing device is the same as the first image capturing device (image capturing device 100). That is, the image capturing device 100, which is one image capturing device, is used as both the first image capturing device and the second image capturing device. However, the second image capturing device may be an image capturing device different from the first image capturing device (image capturing device 100).

In the specific example, the processing circuit 170 reads a computational model expressed by a neural network. The processing circuit 170 performs supervised learning and calculates the recognition accuracy using the first image after the supervised learning. The processing circuit 170 thus configured can perform supervised learning on the basis of the neural network and calculate the recognition accuracy using the first image after the supervised learning. The neural network is suitable for information processing using images. The neural network is, for example, a deep convolutional neural network (DCNN).

An example of the DCNN of the processing circuit 170 is described with reference to FIG. 10. The DCNN illustrated in FIG. 10 has an input layer, a plurality of intermediate layers, and an output layer.

Figure 10:
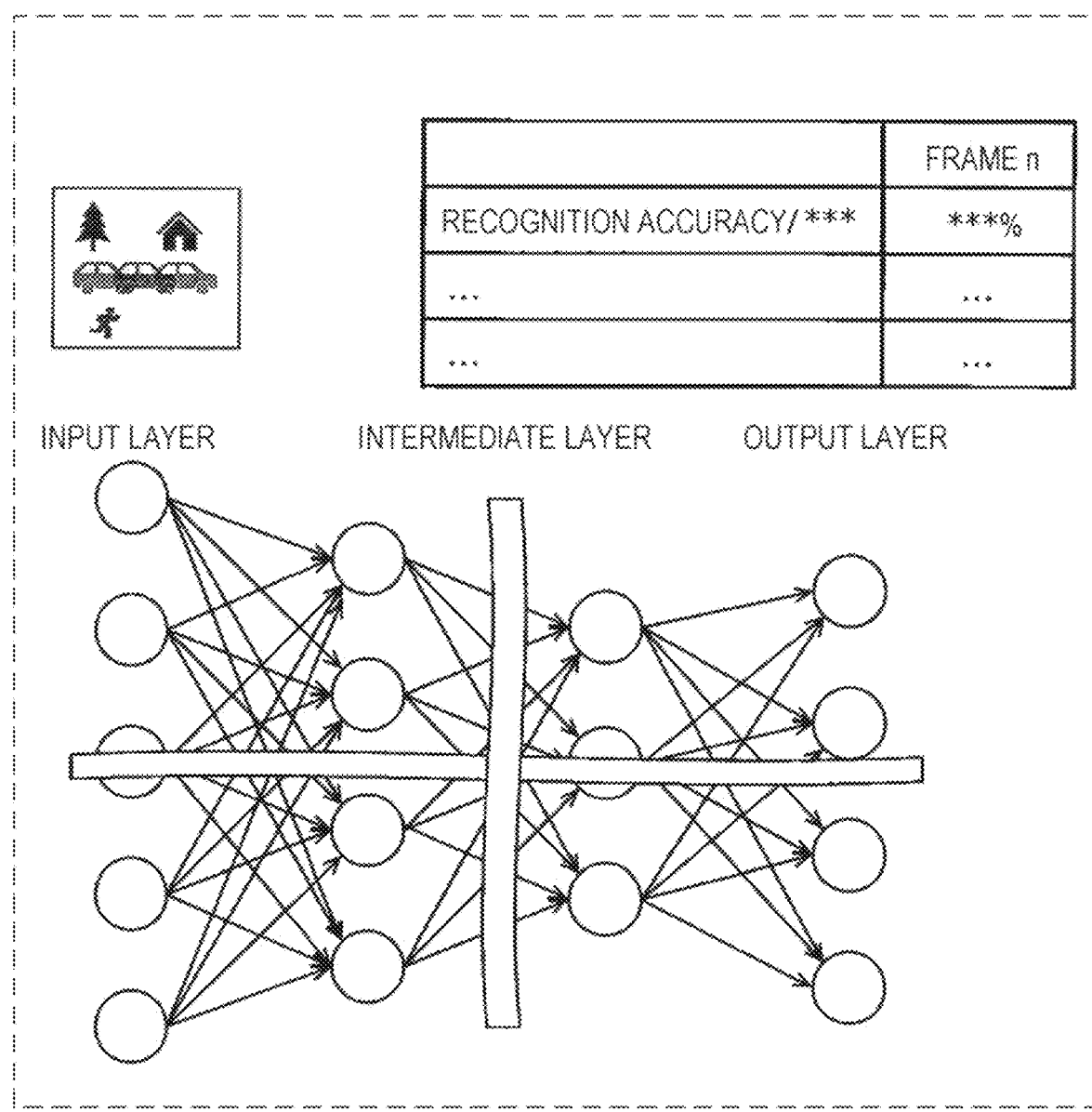
FIG. 10 is a diagram illustrating a neural network.

Learning by the DCNN illustrated in FIG. 10 is described. To make the DCNN perform learning, the processing circuit 170 inputs to the input layer a vector formed of the values of a plurality of pixels included in a teaching image. The processing circuit 170 performs processing, such as convolution, in the intermediate layers. Accordingly, convolution of the plurality of pixels included in the teaching image is performed. The processing circuit 170 calculates an error between an output from the output layer and a correct label that corresponds to the input teaching image.

For example, in a case where objects that are recognition candidates are a person, an automobile, and a house, the processing circuit 170 sets the number of nodes of the output layer to three. That is, an output vector from the output layer is formed of a first output value output from a first node, a second output value output from a second node, and a third output value output from a third node. The processing circuit 170 associates the first output value with the probability of a subject in the teaching image being a person. The processing circuit 170 associates the second output value with the probability of the subject in the teaching image being an automobile. The processing circuit 170 associates the third output value with the probability of the subject in the teaching image being a house. The processing circuit 170 generates a teaching vector that corresponds to the correct label. In the above example, in a case where the correct label is a person, the processing circuit 170 generates a teaching vector (1, 0, 0). The processing circuit 170 calculates an error vector between the teaching vector and the output vector from the output layer of the DCNN. The processing circuit 170 updates the coefficients (for example, weights) of the nodes in the intermediate layers such that the error vector comes closer to a zero vector. In addition to the intermediate layers, the processing circuit 170 may update the coefficients of the nodes in the input layer.

The processing circuit 170 uses a plurality of combinations of one of teaching images and corresponding one of correct labels to make the DCNN perform learning. However, the form of learning by the DCNN is not limited to the above-described example.

The processing circuit 170 uses the DCNN that has performed learning to calculate the recognition accuracy of the first image. Specifically, the processing circuit 170 inputs the values of a plurality of pixels included in the first image to the input layer of the DCNN and performs convolutional processing in the intermediate layers. The processing circuit 170 calculates the recognition accuracy on the basis of the output vector from the output layer. In a case where an output vector (0.04, 0.92, 0.01) is obtained in the above-described example, the processing circuit 170 obtains the second recognition accuracy 0.92 that indicates the probability of the first subject in the first image being an automobile.

Note that before inputting an image to the DCNN, the processing circuit 170 may perform preprocessing on the image. Examples of the preprocessing include noise reduction by filtering. Accordingly, the accuracy of learning and recognition increases.

Learning in the processing circuit 170 is not essential. The processing circuit 170 may be configured to calculate the recognition accuracy by, for example, template matching or feature matching. The processing circuit 170 may be configured to calculate the recognition accuracy using a pattern recognition model, such as a support vector machine (SVM).

An Example in which a Plurality of Image Capturing Devices 100 are Used

Figure 11:
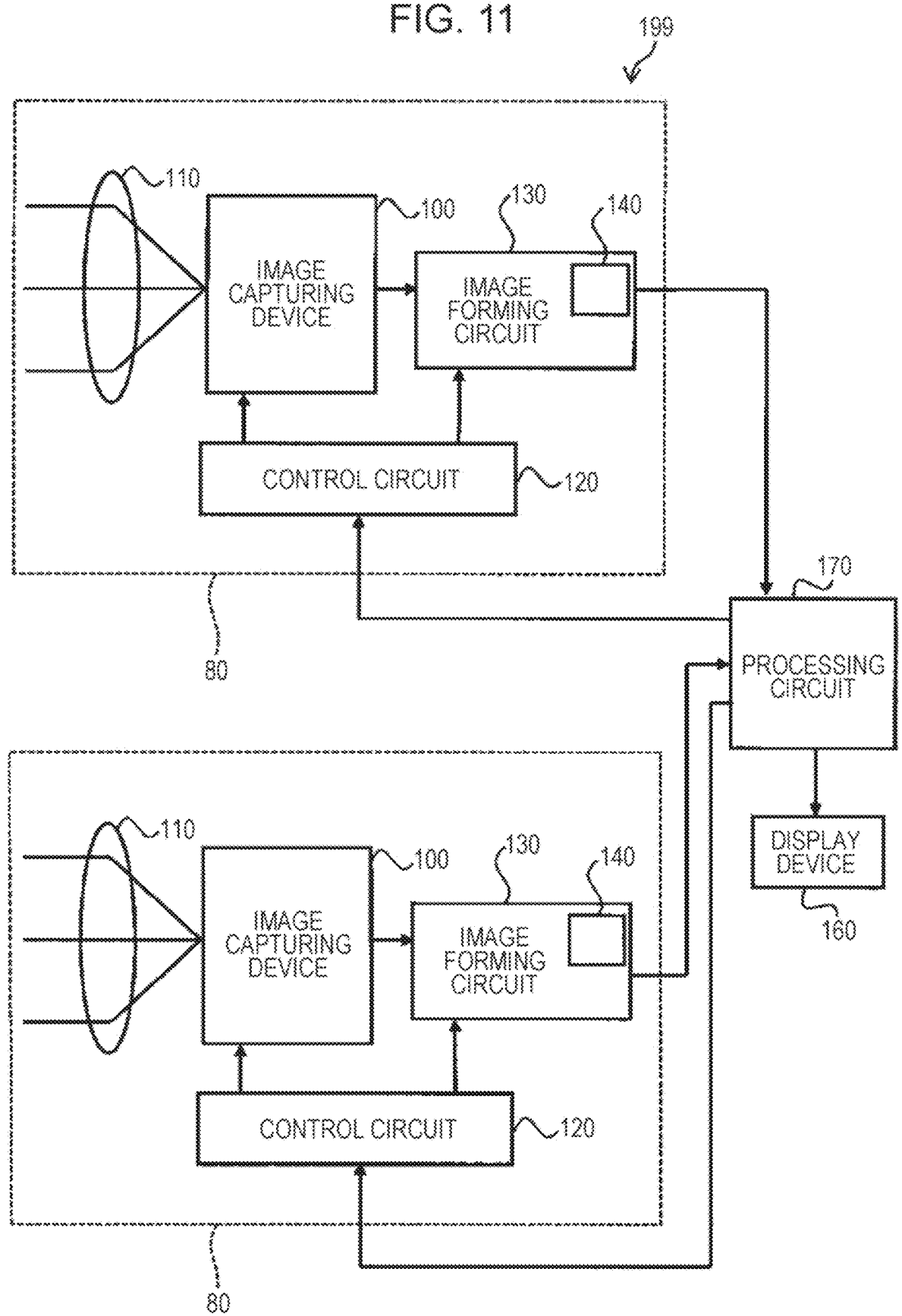
FIG. 11 is a block diagram of an image recognition apparatus.

In the example illustrated in FIG. 11, an image recognition apparatus 199 includes two camera units 80. The two camera units 80 share the processing circuit 170 and the display device 160. The two camera units 80 may form a stereo camera.

Conditions of multiple-exposure image capturing by one of the two camera units 80 may be different from conditions of multiple-exposure image capturing by the other. Accordingly, for example, the recognition process illustrated in FIG. 6 can be performed by the two camera units 80 in parallel. As a consequence, high-speed image recognition is enabled.

Second Embodiment

The second embodiment is described. A description already given in the first embodiment may be omitted below.

In the second embodiment, a value related to the speed of the first subject is calculated instead of the recognition accuracy. Specifically, the processing circuit 170 receives the first image obtained by performing multiple-exposure image capturing of the first subject. The processing circuit 170 uses the first image to calculate an estimated range of the speed of the first subject. The estimated range is a range of value V±error E. The state where the estimated range is the range of value V±error E is a state where the estimated range is a range of value V−error E or more and value V+error E or less. The first image is more suitable for ensuring the accuracy of calculation of the speed of the first subject than an image that includes only one image of one subject. Note that the speed may be expressed by an absolute value or a vector.

The estimated range is further described. In actual estimation of a speed, there may be a case where the presence of an error is taken into consideration. In this case, the speed need not be estimated to be a value of a certain one point in a pinpoint manner but the speed may be estimated to be within a certain range in an approximate manner. The latter approximate estimation corresponds to calculation of the estimated range described above.

In a case where error E is greater than an error threshold, the control circuit 120 changes a condition of multiple-exposure image capturing. The state where error E is large suggests that the accuracy of calculation of the speed of the first subject is low. In the second embodiment, when error E is large, a condition of multiple-exposure image capturing is changed. This change can decrease error E. That is, this change can lead to a situation suggesting that the accuracy of calculation of the speed of the first subject is high. The error threshold is a specific value within a range of, for example, 3% or more and 20% or less.

Specifically, in this embodiment, in a case where a condition of multiple-exposure image capturing has been changed, the processing circuit 170 receives the first image that reflects the change. The processing circuit 170 uses the first image to recalculate the estimated range of the speed of the first subject.

More specifically, in this embodiment, calculation of the estimated range by the processing circuit 170 and changing of a condition by the control circuit 120 in a case where error E is greater than the error threshold are repeated until an end condition is satisfied.

The processing circuit 170 outputs the image and the estimated range of the speed of the first subject to the display device 160. The processing circuit 170 may be configured to output value V and error E to the display device 160. The processing circuit 170 outputs error E to the control circuit 120.

The display device 160 displays the image and the estimated range of the speed of the first subject. The display device 160 may be configured to display value V and error E.

The control circuit 120 controls image capturing conditions of the image capturing device 100. As in the first embodiment, the control circuit 120 can change a condition of multiple-exposure image capturing. The condition to be changed can include at least one selected from the group consisting of conditions (a) to (h) as in the first embodiment. The control circuit 120 controls image forming conditions of the image forming circuit 130.

In the second embodiment, the display device 160 is an internal display device of the image recognition apparatus 99. That is, the image recognition apparatus 99 includes the internal display device that displays the estimated range of the speed of the first subject. Specifically, the internal display device can display the first image and the estimated range. The internal display device may be configured to display value V and error E.

The image recognition apparatus 99 may include an output interface for outputting the estimated range to an external display device that displays the estimated range. Specifically, the image recognition apparatus 99 may include an output interface for outputting to an external display device the first image and the estimated range. The external display device may be a device that displays the first image and the estimated range. The output interface may be configured so as to output value V and error E. The external display device may be configured to display value V and error E.

The image recognition apparatus 99 may include either the internal display device or the output interface. The image recognition apparatus 99 may include both of them.

Also in the second embodiment, a condition of multiple-exposure image capturing and the first image are associated with each other as in the first embodiment.

Also in the second embodiment, the processing circuit 170 performs supervised learning using a plurality of combinations of one of teaching images and corresponding one of correct labels as in the first embodiment. A teaching image corresponds to the first image. A correct label corresponds to the speed of the first subject. The processing circuit 170 calculates the estimated range of the speed of the first subject using the first image after supervised learning. With the processing circuit 170 thus configured, the accuracy of calculation of the speed of the first subject can be easily ensured.

The other techniques described in the first embodiment are also applicable to the second embodiment.

Figure 12:
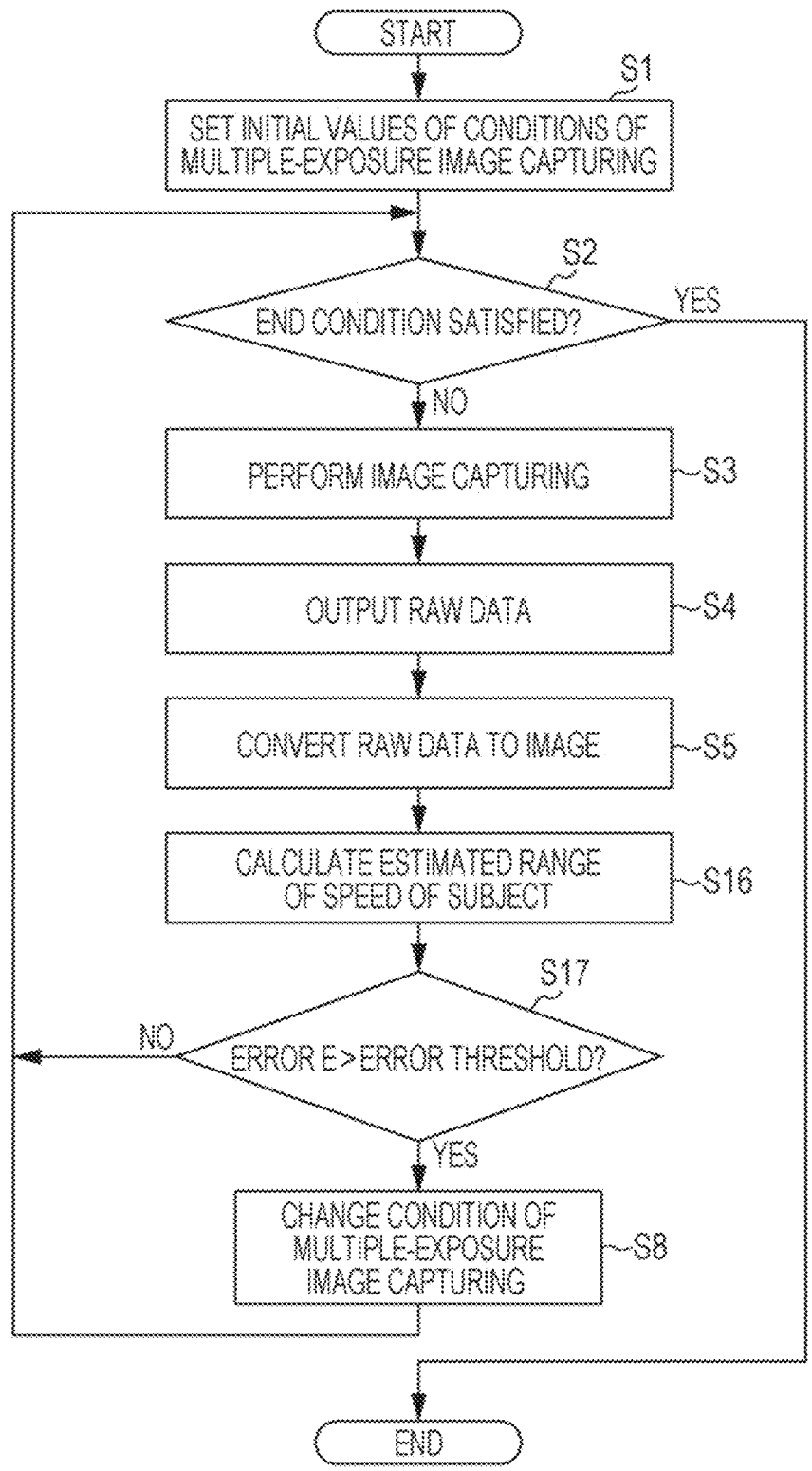
FIG. 12 is a flowchart illustrating control by the image recognition apparatus.

A Specific Example of the Way of Changing a Condition of Multiple-Exposure Image Capturing In the second embodiment, a condition of multiple-exposure image capturing can be changed in accordance with the flowchart illustrated in FIG. 12. The flowchart illustrated in FIG. 12 is described below. A description of part of the flowchart already given with reference to the flowchart in FIG. 6 may be omitted below.

In step S16, the estimated range of the speed of a subject included in the image is calculated by the processing circuit 170. There may be a case where the image used in this calculation is the first image obtained by performing multiple-exposure image capturing of the first subject. In this case, the processing circuit 170 uses the first image to calculate the estimated range of the speed of the first subject. The processing circuit 170 outputs error E to the control circuit 120. After step S16, the flow proceeds to step S17.

In step S17, the control circuit 120 determines whether error E is greater than an error threshold. In a case where error E is greater than the error threshold, the flow proceeds to step S8. In a case where error E is less than or equal to the error threshold, the flow returns to step S2.

A first example of the end condition in step S2 in the second embodiment is the first example of the end condition in step S2 in the first embodiment.

A second example of the end condition in step S2 in the second embodiment is the second example of the end condition in step S2 in the first embodiment.

A third example of the end condition in step S2 is a condition that error E calculated most recently in step S16 is greater than a second upper threshold. In a case where error E is greater than the second upper threshold, the flow ends. In a case where error E is less than or equal to the second upper threshold, the flow proceeds to step S3. Typically, the second upper threshold is greater than the error threshold.

A fourth example of the end condition in step S2 is a condition that error E calculated most recently in step S16 is less than a second lower threshold. In a case where error E is less than the second lower threshold, the flow ends. In a case where error E is greater than or equal to the second lower threshold, the flow proceeds to step S3. Typically, the second lower threshold is less than the error threshold.

The flow may end in a case where the third example condition or the fourth example condition is satisfied. Otherwise, the flow may proceed to step S3.

A fifth example of the end condition in step S2 is a condition that a situation where error E calculated in step S16 is greater than the second upper threshold is successively determined a fourth threshold number of times. In a case where this situation is successively determined the fourth threshold number of times, the flow ends. Otherwise, the flow proceeds to step S3. This condition can be considered to be a condition that a frame that leads to the above-described situation successively appears the fourth threshold number of times.

A sixth example of the end condition in step S2 is a condition that a situation where error E calculated in step S16 is less than the second lower threshold is successively determined a fifth threshold number of times. In a case where this situation is successively determined the fifth threshold number of times, the flow ends. Otherwise, the flow proceeds to step S3. This condition can be considered to be a condition that a frame that leads to the above-described situation successively appears the fifth threshold number of times.

The flow may end in a case where the fifth example condition or the sixth example condition is satisfied. Otherwise, the flow may proceed to step S3. In this case, the fourth threshold number of times and the fifth threshold number of times may be the same or may be different from each other.

A seventh example of the end condition in step S2 in the second embodiment is the seventh example of the end condition in step S2 in the first embodiment.

A change in a condition of multiple-exposure image capturing according to the flowchart illustrated in FIG. 12 can increase the accuracy of calculation of the speed. This is described with reference to FIG. 13A and FIG. 13B. The example illustrated in FIG. 13A and FIG. 13B assumes that the above-described condition to be changed is the exposure interval.

FIG. 13A illustrates conditions of multiple-exposure image capturing for frame n and conditions of multiple-exposure image capturing for frame n+α, where n and a are natural numbers. FIG. 13A indicates that the exposure interval is changed from 2 ms to 4 ms in accordance with the flowchart illustrated in FIG. 12.

FIG. 13B illustrates value V and error E for frame n and value V and error E for frame n+α. For both frames, value V is 50 km/h. Error E for frame n is 15 km/h. Error E for frame n+α is 5 km/h. Error E for frame n+α is less than error E for frame n. FIG. 13B indicates that the accuracy of calculation of the speed of the first subject increases in accordance with the flowchart illustrated in FIG. 12.

Third Embodiment

Figure 14:
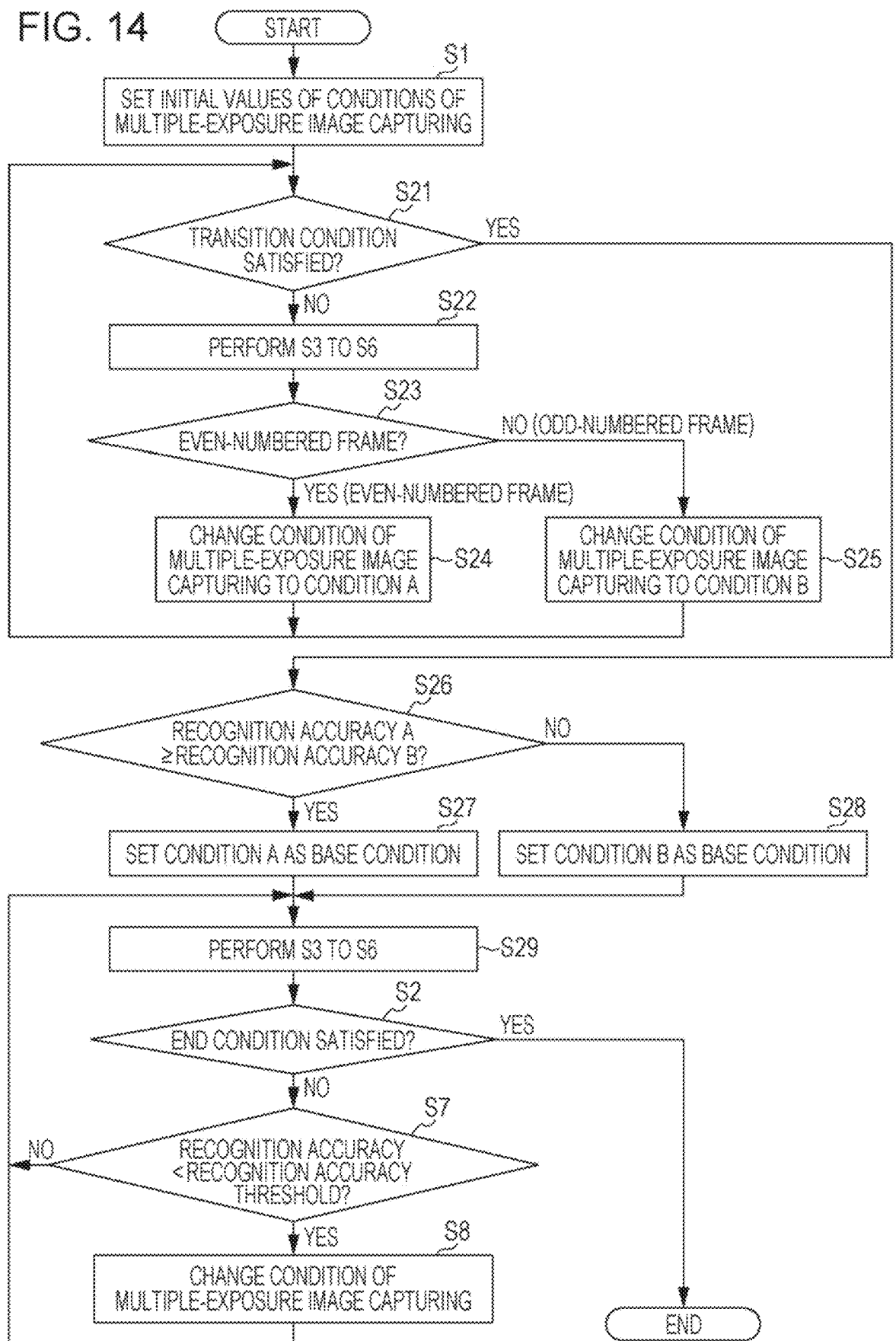
FIG. 14 is a flowchart illustrating control by the image recognition apparatus.

In a third embodiment, a condition of multiple-exposure image capturing can be changed in accordance with the flowchart illustrated in FIG. 14. The flowchart illustrated in FIG. 14 is described below. A description of part of the flowchart already given with reference to the flowchart in FIG. 6 may be omitted below.

After step S1, the flow proceeds to step S21. In step S21, it is determined whether a transition condition is satisfied. A specific example of the transition condition will be described below. In a case where the transition condition is satisfied, the flow proceeds to step S26. In a case where the transition condition is not satisfied, the flow proceeds to step S22.

In step S22, steps S3, S4, S5, and S6 in FIG. 6 are performed in this order. After step S22, the flow proceeds to step S23.

In step S23, it is determined whether a frame for which the recognition process has been performed in step S6 is an even-numbered frame or an odd-numbered frame counted since "start". In a case where the frame is an even-numbered frame, the flow proceeds to step S24. In a case where the frame is an odd-numbered frame, the flow proceeds to step S25.

In step S24, a condition of multiple-exposure image capturing is changed to condition A by the control circuit 120. After step S24, the flow returns to step S21.

In step S25, the condition of multiple-exposure image capturing is changed to condition B by the control circuit 120. After step S25, the flow returns to step S21.

In this specific example, the transition condition in step S21 is a condition that each of recognition accuracy A and recognition accuracy B has been obtained J times since "start", where J is a natural number. J is, for example, 1. Recognition accuracy A is a recognition accuracy obtained when step S6 in step S22 is performed in a state where condition A has been employed in step S24. Recognition accuracy B is a recognition accuracy obtained when step S6 in step S22 is performed in a state where condition B has been employed in step S25. Condition A and condition B are image capturing conditions different from each other.

In step S26, recognition accuracy A and recognition accuracy B are compared with each other. In a case where recognition accuracy A is higher than or equal to recognition accuracy B, the flow proceeds to step S27. In a case where recognition accuracy A is lower than recognition accuracy B, the flow proceeds to step S28.

In a case where the flow proceeds to step S27, condition A is set as a base condition. In a case where the flow proceeds to step S28, condition B is set as the base condition.

As understood from the above description, recognition accuracy A and recognition accuracy B are used when the base condition is set. Recognition accuracy A and recognition accuracy B can be referred to as recognition accuracies for reference.

After step S27 or step S28, in step S29, steps S3, S4, S5, and S6 in FIG. 6 are performed in this order.

In step S29, image capturing in step S3 is performed. In a case where condition A is set as the base condition, image capturing in step S29 performed for the first time is performed in a state where the condition of multiple-exposure image capturing is set to condition A. In a case where condition B is set as the base condition, image capturing in step S29 performed for the first time is performed in a state where the condition of multiple-exposure image capturing is set to condition B. After step S29, the flow proceeds to step S2.

In step S2, it is determined whether the end condition is satisfied as in the first embodiment. In a case where the end condition is satisfied, the flow ends. In a case where the end condition is not satisfied, the flow proceeds to step S7.

In step S7, the control circuit 120 determines whether the recognition accuracy is lower than the recognition accuracy threshold as in the first embodiment. In a case where the recognition accuracy is lower than the recognition accuracy threshold, the flow proceeds to step S8. In a case where the recognition accuracy is higher than or equal to the recognition accuracy threshold, the flow returns to step S29.

In step S8, the condition of multiple-exposure image capturing is changed by the control circuit 120 as in the first embodiment. After step S8, the flow returns to step S29.

According to the flowchart illustrated in FIG. 14, in step S26, it is determined whether a higher recognition accuracy can be attained with condition A or condition B. In step S29, the condition with which a higher recognition accuracy can be attained is used as the condition of multiple-exposure image capturing performed for the first time. This is advantageous from the viewpoint of quickly identifying a condition of multiple-exposure image capturing with which a higher recognition accuracy is attained in step S29 and thereafter.

When a condition of multiple-exposure image capturing is changed in accordance with the flowchart illustrated in FIG. 14, the recognition accuracy changes. An example form of changes is described with reference to FIG. 15. The example illustrated in FIG. 15 assumes that the above-described condition to be changed is the exposure interval.

Figure 15:
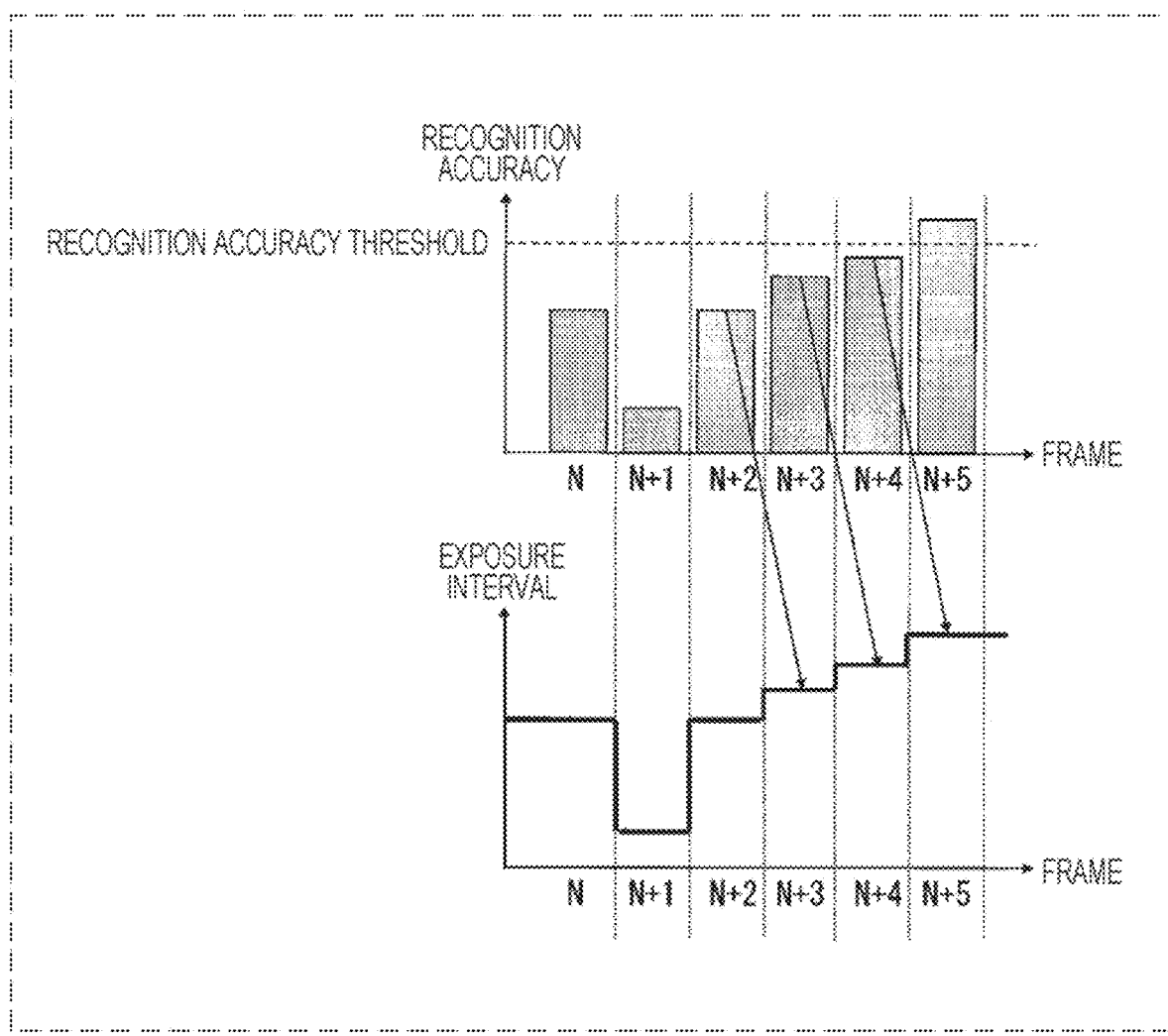
FIG. 15 is a diagram illustrating changes in an exposure interval and in a recognition accuracy.

In the example illustrated in FIG. 15, in step S22 for frame N, multiple-exposure image capturing is performed by using condition A.

In step S22 for frame N+1, multiple-exposure image capturing is performed by using condition B.

In the example, condition A and condition B are conditions of the exposure interval. As illustrated in the lower part of FIG. 15, the exposure interval for frame N+1 is shorter than the exposure interval for frame N. This means that the exposure interval of condition B is shorter than the exposure interval of condition A. As illustrated in the upper part of FIG. 15, the recognition accuracy for frame N+1 is lower than the recognition accuracy of frame N. In this situation, recognition accuracy A≥recognition accuracy B is determined in step S26. The flow proceeds to step S27, and condition A is set as the base condition.

The base condition is condition A, and therefore, multiple-exposure image capturing in step S29 is performed for frame N+2 by using condition A. In step S7 for frame N+2, it is determined that the recognition accuracy is lower than the recognition accuracy threshold. Therefore, for the subsequent frame N+3, an exposure interval longer than the exposure interval for frame N+2 is employed.

In step S7 for frame N+3, it is determined that the recognition accuracy is lower than the recognition accuracy threshold. Therefore, for the subsequent frame N+4, an exposure interval longer than the exposure interval for frame N+3 is employed.

In step S7 for frame N+4, it is determined that the recognition accuracy is lower than the recognition accuracy threshold. Therefore, for the subsequent frame N+5, an exposure interval longer than the exposure interval for frame N+4 is employed.

In the example illustrated in FIG. 15, an exposure interval longer than the exposure interval for the frame N+4 is employed for frame N+5. As a result, the recognition accuracy exceeds the recognition accuracy threshold.

As described above, in the third embodiment, the processing circuit 170 calculates recognition accuracies for a plurality of first images obtained by using different conditions to thereby calculate a plurality of recognition accuracies for reference. The control circuit 120 compares the plurality of recognition accuracies for reference with each other and selects a base condition that is a condition served as a base. The base condition is, for example, a condition with which the highest recognition accuracy is attained among the above-described different conditions. The processing circuit 170 uses the first image that is obtained by using the base condition and that is different from the first images used to calculate the plurality of recognition accuracies for reference to calculate a recognition accuracy that is to be compared with the recognition accuracy threshold.

In the third embodiment, specifically, condition A and condition B are provided as conditions of multiple-exposure image capturing. Condition A is used to perform multiple-exposure image capturing of the first subject. The processing circuit 170 uses the first image obtained by using condition A to calculate recognition accuracy A, which is a recognition accuracy of the first subject in the first image. Condition B is used to perform multiple-exposure image capturing of the first subject. The processing circuit 170 uses the first image obtained by using condition B to calculate recognition accuracy B, which is a recognition accuracy of the first subject in the first image. The control circuit 120 compares recognition accuracy A and recognition accuracy B with each other. The control circuit 120 selects a base condition on the basis of the comparison. The base condition is a condition with which a higher recognition accuracy is attained among condition A and condition B. The processing circuit 170 uses the first image that is obtained by using the base condition and that is different from the first images used to calculate recognition accuracy A and recognition accuracy B to calculate a recognition accuracy that is to be compared with the recognition accuracy threshold.

Thereafter, the processing circuit 170 uses the first image obtained by using the base condition to calculate the recognition accuracy of the first subject. In a case where the recognition accuracy is lower than the recognition accuracy threshold, the control circuit 120 changes the condition of multiple-exposure image capturing. Specifically, in a case where the condition of multiple-exposure image capturing has been changed, the processing circuit 170 receives the first image that reflects the change. The processing circuit 170 uses the first image to recalculate the recognition accuracy.

Fourth Embodiment

Figure 16:
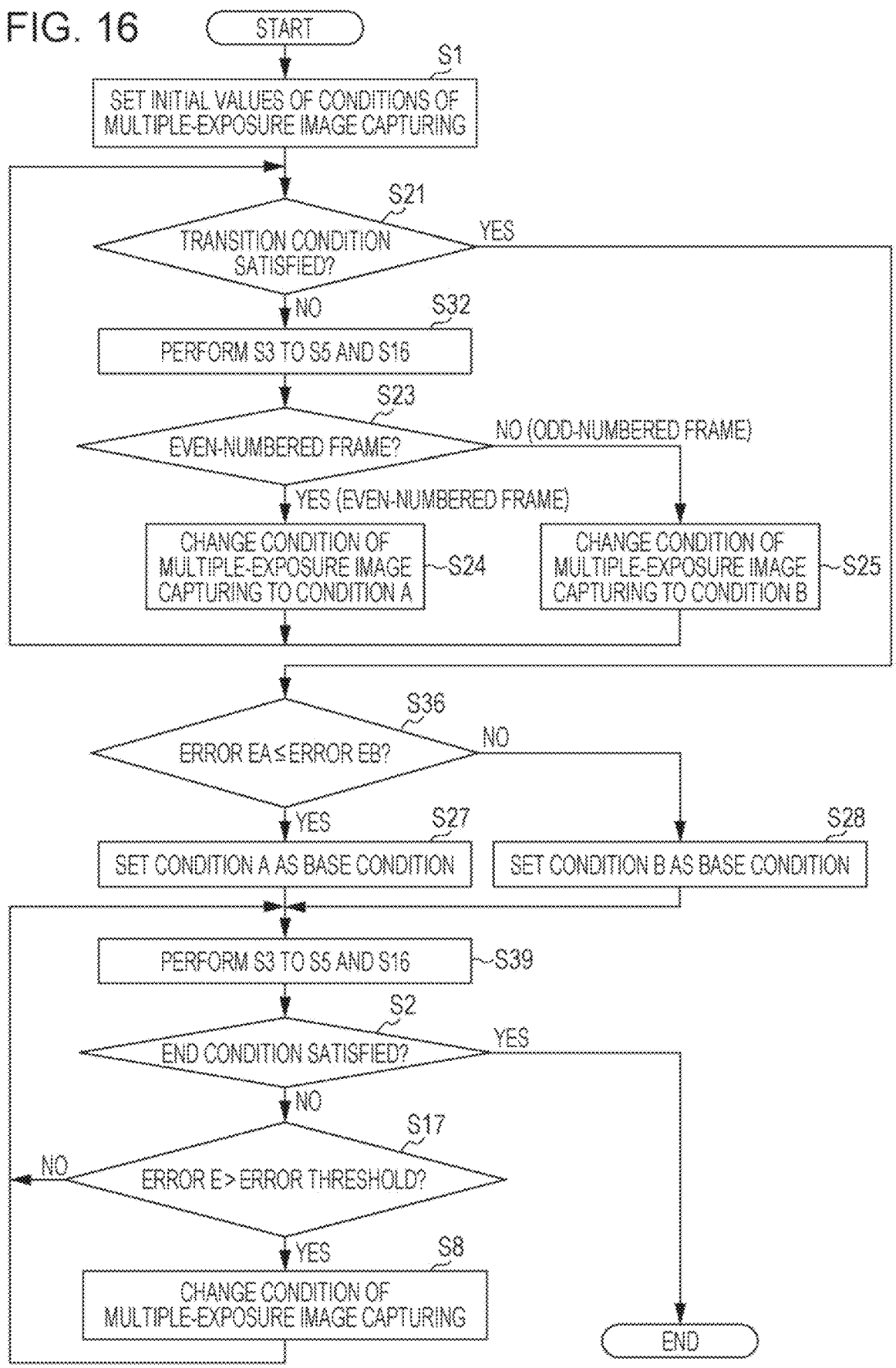
FIG. 16 is a flowchart illustrating control by the image recognition apparatus.

In a fourth embodiment, a condition of multiple-exposure image capturing can be changed in accordance with the flowchart illustrated in FIG. 16. The flowchart illustrated in FIG. 16 is described below. A description of part of the flowchart already given with reference to the flowcharts in FIG. 12 and/or FIG. 14 may be omitted below.

After step S1, the flow proceeds to step S21. In step S21, it is determined whether a transition condition is satisfied. A specific example of the transition condition will be described below. In a case where the transition condition is satisfied, the flow proceeds to step S36. In a case where the transition condition is not satisfied, the flow proceeds to step S32.

In step S32, steps S3, S4, S5, and S16 in FIG. 12 are performed in this order. After step S32, the flow proceeds to step S23.

In step S23, it is determined whether a frame for which calculation of the speed of the subject has been performed in step S16 is an even-numbered frame or an odd-numbered frame counted since "start". In a case where the frame is an even-numbered frame, the flow proceeds to step S24. In a case where the frame is an odd-numbered frame, the flow proceeds to step S25.

In step S24, a condition of multiple-exposure image capturing is changed to condition A by the control circuit 120. After step S24, the flow returns to step S21.

In step S25, the condition of multiple-exposure image capturing is changed to condition B by the control circuit 120. After step S25, the flow returns to step S21.

In this specific example, the transition condition in step S21 is a condition that each of error EA and error EB has been obtained K times since "start", where K is a natural number. K is, for example, 1. Error EA is error E obtained when step S16 in step S32 is performed in a state where condition A has been employed in step S24. Error EB is error E obtained when step S16 in step S32 is performed in a state where condition B has been employed in step S25.

In step S36, error EA and error EB are compared with each other. In a case where error EA is less than or equal to error EB, the flow proceeds to step S27. In a case where error EA is greater than error EB, the flow proceeds to step S28.

In a case where the flow proceeds to step S27, condition A is set as a base condition. In a case where the flow proceeds to step S28, condition B is set as the base condition.

As understood from the above description, error EA and error EB are used when the base condition is set. Error EA and error EB can be referred to as errors E for reference.

After step S27 or step S28, in step S39, steps S3, S4, S5, and S16 in FIG. 12 are performed in this order.

In step S39, image capturing in step S3 is performed. In a case where condition A is set as the base condition, image capturing in step S39 performed for the first time is performed in a state where the condition of multiple-exposure image capturing is set to condition A. In a case where condition B is set as the base condition, image capturing in step S39 performed for the first time is performed in a state where the condition of multiple-exposure image capturing is set to condition B. After step S39, the flow proceeds to step S2.

In step S2, it is determined whether the end condition is satisfied as in the second embodiment. In a case where the end condition is satisfied, the flow ends. In a case where the end condition is not satisfied, the flow proceeds to step S17.

In step S17, the control circuit 120 determines whether error E is greater than the error threshold as in the second embodiment. In a case where error E is greater than the error threshold, the flow proceeds to step S8. In a case where error E is less than or equal to the error threshold, the flow returns to step S39.

In step S8, the condition of multiple-exposure image capturing is changed by the control circuit 120 as in the second embodiment. After step S8, the flow returns to step S39.

According to the flowchart illustrated in FIG. 16, in step S36, it is determined whether a smaller error E can be obtained by using condition A or condition B. In step S39, the condition with which a smaller error E can be obtained is used as the condition of multiple-exposure image capturing performed for the first time. This is advantageous from the viewpoint of quickly identifying a condition of multiple-exposure image capturing with which a smaller error E is obtained in step S39 and thereafter.

As described above, in the fourth embodiment, the processing circuit 170 calculates estimated ranges for a plurality of first images obtained by using different conditions to thereby calculate a plurality of errors E for reference. The control circuit 120 compares the plurality of errors E for reference with each other and selects a base condition that is a condition served as a base. The base condition is, for example, a condition with which the smallest error E is obtained among the above-described different conditions. The processing circuit 170 uses the first image that is obtained by using the base condition and that is different from the first images used to calculate the plurality of errors E for reference to calculate error E that is to be compared with the error threshold.

In the fourth embodiment, specifically, condition A and condition B are provided as conditions of multiple-exposure image capturing. Condition A is used to perform multiple-exposure image capturing of the first subject. The processing circuit 170 uses the first image obtained by using condition A to calculate error EA, which is error E. Condition B is used to perform multiple-exposure image capturing of the first subject. The processing circuit 170 uses the first image obtained by using condition B to calculate error EB, which is error E. The control circuit 120 compares error EA and error EB with each other. The control circuit 120 selects a base condition on the basis of the comparison. The base condition is a condition with which a smaller error E is obtained among condition A and condition B. The processing circuit 170 uses the first image that is obtained by using the base condition and that is different from the first images used to calculate error EA and error EB to calculate error E that is to be compared with the error threshold.

Thereafter, the processing circuit 170 uses the first image obtained by using the base condition to calculate the estimated range of the speed of the first subject. In a case where error E is greater than the error threshold, the control circuit 120 changes the condition of multiple-exposure image capturing. Specifically, in a case where the condition of multiple-exposure image capturing has been changed, the processing circuit 170 receives the first image that reflects the change. The processing circuit 170 uses the first image to recalculate the estimated range.

First Reference Embodiment

Figure 17:
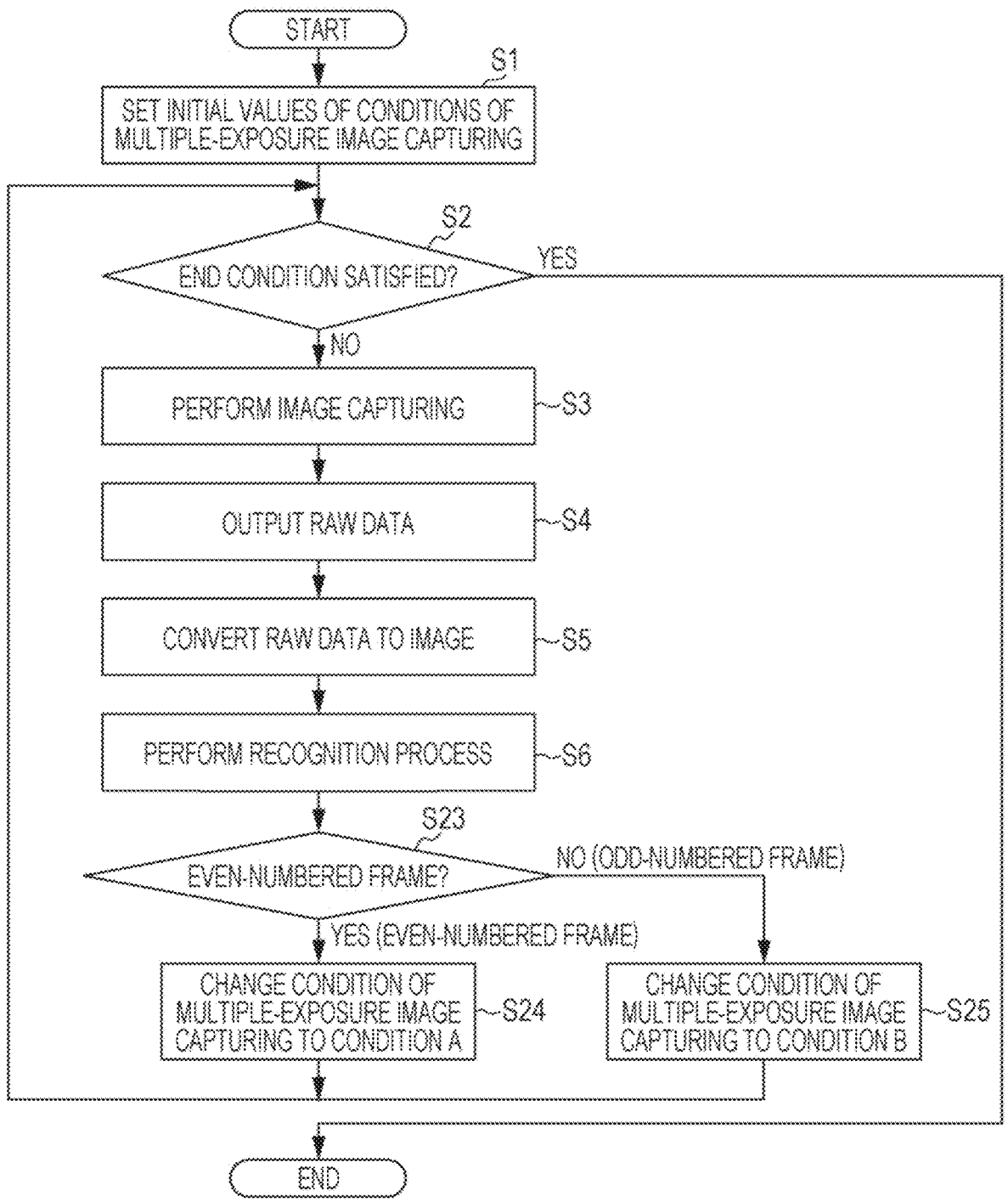
FIG. 17 is a flowchart illustrating control by the image recognition apparatus.

In a first reference embodiment, a condition of multiple-exposure image capturing can be changed in accordance with the flowchart illustrated in FIG. 17. The flowchart illustrated in FIG. 17 is described below. A description of part of the flowchart already given with reference to the flowcharts in FIG. 6 and/or FIG. 14 may be omitted below.

After step S1, the flow proceeds to step S2. In step S2, it is determined whether the end condition is satisfied as in the first embodiment. In a case where the end condition is satisfied, the flow ends. In a case where the end condition is not satisfied, the flow proceeds to step S3.

As in the first embodiment, steps S3, S4, S5, and S6 in FIG. 6 are performed in this order. After step S6, the flow proceeds to step S23.

In step S23, it is determined whether a frame for which the recognition process has been performed in step S6 is an even-numbered frame or an odd-numbered frame counted since "start" as in the third embodiment. In a case where the frame is an even-numbered frame, the flow proceeds to step S24. In a case where the frame is an odd-numbered frame, the flow proceeds to step S25.

In step S24, a condition of multiple-exposure image capturing is changed to condition A by the control circuit 120 as in the third embodiment. After step S24, the flow returns to step S2.

In step S25, the condition of multiple-exposure image capturing is changed to condition B by the control circuit 120 as in the third embodiment. After step S25, the flow returns to step S2.

When a condition of multiple-exposure image capturing is changed in accordance with the flowchart illustrated in FIG. 17, the recognition accuracy changes. An example form of changes is described with reference to FIG. 18. The example illustrated in FIG. 18 assumes that the above-described condition to be changed is the exposure interval.

Figure 18:
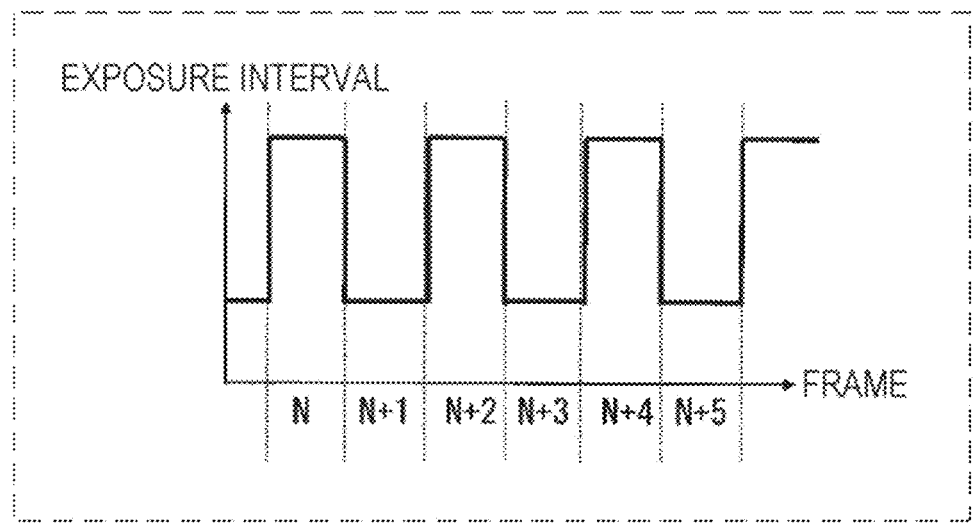
FIG. 18 is a diagram illustrating changes in an exposure interval.

In the example illustrated in FIG. 18, in step S3 for frame N, frame N+2, and frame N+4, multiple-exposure image capturing is performed by using condition A. In step S3 for frame N+1, frame N+3, and frame N+5, multiple-exposure image capturing is performed by using condition B.

In the example, condition A and condition B are conditions of the exposure interval. As illustrated in FIG. 18, the exposure interval for frame N+1 is shorter than the exposure interval for frame N. This means that the exposure interval of condition B is shorter than the exposure interval of condition A.

As described above, in the example illustrated in FIG. 18, multiple-exposure image capturing with a long exposure interval and multiple-exposure image capturing with a short exposure interval are alternately repeated. Typically, a high recognition accuracy is attained with either of the exposure intervals. This can reduce the number of repetitions of the steps in the flowchart performed until a condition with which a high recognition accuracy is attained is identified. In this regard, the example illustrated in FIG. 18 can be more advantageous than the example illustrated in FIG. 6.

As described above, in the first reference embodiment, the image recognition apparatus 99 includes the processing circuit 170 and the control circuit 120. The processing circuit 170 receives the first image obtained by performing multiple-exposure image capturing of the first subject and uses the first image to calculate the recognition accuracy of the first subject. The control circuit 120 changes a condition of multiple-exposure image capturing. The processing circuit 170 calculates recognition accuracies for a plurality of first images obtained by using different conditions to thereby calculate a plurality of recognition accuracies.

Specifically, condition A and condition B are provided as conditions of multiple-exposure image capturing. Condition A is used to perform multiple-exposure image capturing of the first subject. The processing circuit 170 uses the first image obtained by using condition A to calculate a recognition accuracy of the first subject in the first image. Condition B is used to perform multiple-exposure image capturing of the first subject. The processing circuit 170 uses the first image obtained by using condition B to calculate a recognition accuracy of the first subject in the first image.

Second Reference Embodiment

Figure 19:
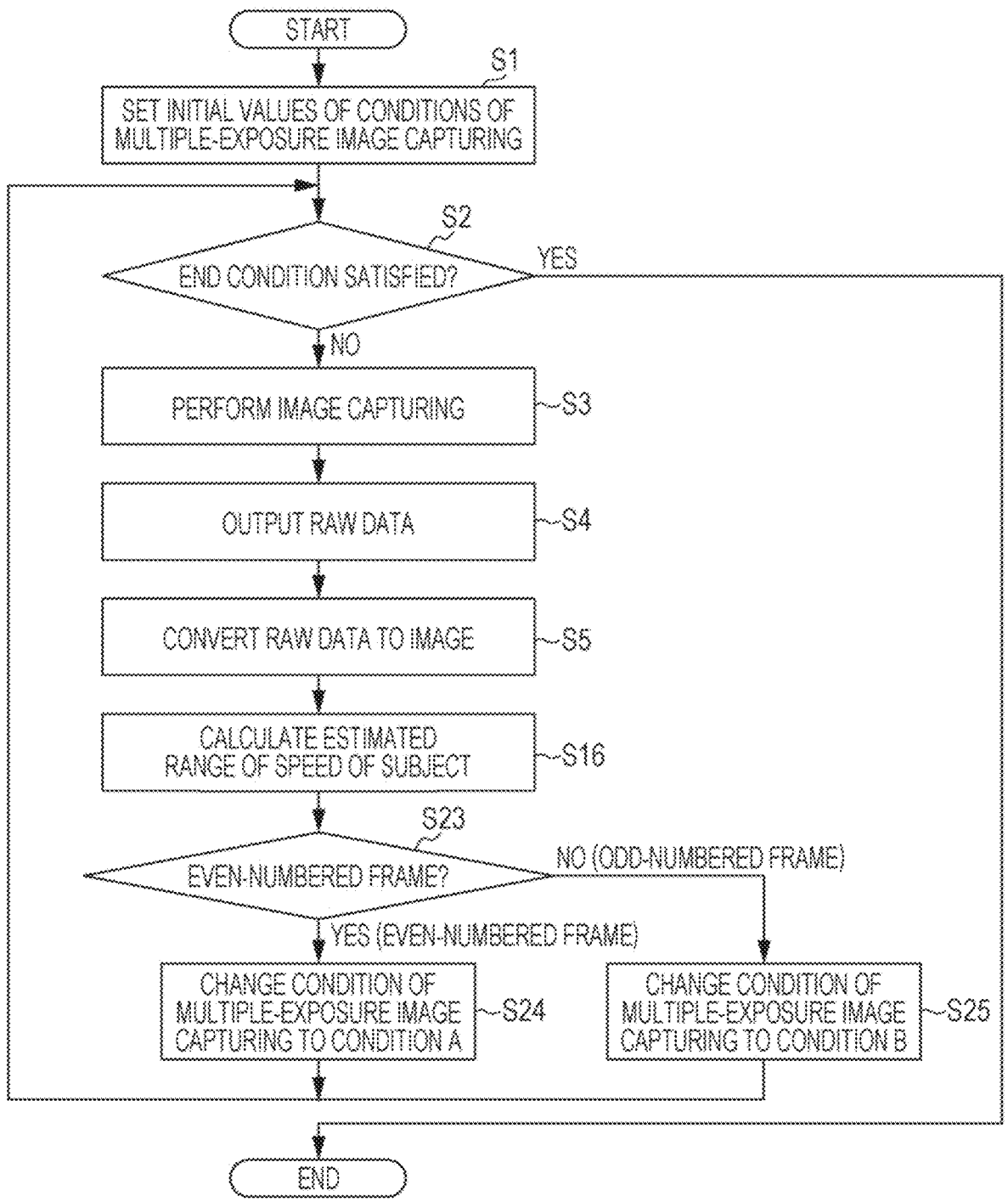
FIG. 19 is a flowchart illustrating control by the image recognition apparatus.

In a second reference embodiment, a condition of multiple-exposure image capturing can be changed in accordance with the flowchart illustrated in FIG. 19. The flowchart illustrated in FIG. 19 is described below. A description of part of the flowchart already given with reference to the flowcharts in FIG. 12 and/or FIG. 16 may be omitted below.

After step S1, the flow proceeds to step S2. In step S2, it is determined whether the end condition is satisfied as in the second embodiment. In a case where the end condition is satisfied, the flow ends. In a case where the end condition is not satisfied, the flow proceeds to step S3.

As in the second embodiment, steps S3, S4, S5, and S16 in FIG. 12 are performed in this order. After step S16, the flow proceeds to step S23.

In step S23, it is determined whether a frame for which calculation of the speed of the subject has been performed in step S16 is an even-numbered frame or an odd-numbered frame counted since "start" as in the fourth embodiment. In a case where the frame is an even-numbered frame, the flow proceeds to step S24. In a case where the frame is an odd-numbered frame, the flow proceeds to step S25.

In step S24, a condition of multiple-exposure image capturing is changed to condition A by the control circuit 120 as in the fourth embodiment. After step S24, the flow returns to step S2.

In step S25, the condition of multiple-exposure image capturing is changed to condition B by the control circuit 120 as in the fourth embodiment. After step S25, the flow returns to step S2.

As described above, in the second reference embodiment, the image recognition apparatus 99 includes the processing circuit 170 and the control circuit 120. The processing circuit 170 receives the first image obtained by performing multiple-exposure image capturing of the first subject and uses the first image to calculate the estimated range of the speed of the first subject. The control circuit 120 changes a condition of multiple-exposure image capturing. The processing circuit 170 calculates estimated ranges for a plurality of first images obtained by using different conditions to thereby calculate a plurality of errors E.

Specifically, condition A and condition B are provided as conditions of multiple-exposure image capturing. Condition A is used to perform multiple-exposure image capturing of the first subject. The processing circuit 170 uses the first image obtained by using condition A to calculate an estimated range of the speed of the first subject. Condition B is used to perform multiple-exposure image capturing of the first subject. The processing circuit 170 uses the first image obtained by using condition B to calculate an estimated range of the speed of the first subject.

Fifth Embodiment

A fifth embodiment is described below. A description already given in the first and second embodiments may be omitted below.

In the fifth embodiment, a value related to the relative speed of the image capturing device 100 with reference to the first subject is calculated instead of the speed of the first subject. As the first subject, a stationary subject may be selected. In this case, a calculated relative speed of the image capturing device 100 is the speed of the image capturing device 100, that is, the speed of a moving object, which is, for example, a vehicle, in which the image capturing device 100 is installed. In this embodiment, image capturing of the first subject that remains stationary is performed to calculate a value related to the speed of the moving object in which the image capturing device 100 is installed. Specifically, the processing circuit 170 receives the first image obtained by performing multiple-exposure image capturing of the first subject. The processing circuit 170 uses the first image and distance information about the distance to the first subject to calculate an estimated range of the speed of the moving object in which the image capturing device 100 is installed. The distance information about the distance to the first subject may be obtained by using a device, such as a stereo camera, a Time-of-Flight (TOF) sensor, a laser radar, or a sonar.

In a case where the first subject has a certain size, the distance information about the distance to the first subject may be obtained on the basis of the size of the first subject in the first image. Examples of the technique for calculating, from the image obtained by multiple-exposure image capturing, the speed of the moving object in which the image capturing device 100 is installed are described in, for example, International Publication No. WO2018/139212 and U.S. Patent Application Publication No. 2019/0113332. The entire content disclosed by International Publication No. WO2018/139212 and U.S. Patent Application Publication No. 2019/0113332 is cited herein for reference. The estimated range is a range of value V±error E. The state where the estimated range is the range of value V±error E is a state where the estimated range is a range of value V−error E or more and value V+error E or less. The first image is more suitable for ensuring the accuracy of calculation of the speed of the moving object in which the image capturing device 100 is installed than an image that includes only one image of one subject. Note that the speed may be expressed by an absolute value or a vector.

The estimated range is further described. In actual estimation of a speed, there may be a case where the presence of an error is taken into consideration. In this case, the speed need not be estimated to be a value of a certain one point in a pinpoint manner but the speed may be estimated to be within a certain range in an approximate manner. The latter approximate estimation corresponds to calculation of the estimated range described above.

In a case where error E is greater than an error threshold, the control circuit 120 change a condition of multiple-exposure image capturing. The state where error E is large indicates that the accuracy of calculation of the speed of the moving object in which the image capturing device 100 is installed is low. In the fifth embodiment, when error E is large, a condition of multiple-exposure image capturing is changed. This change can decrease error E. That is, this change leads to a situation suggesting that the accuracy of calculation of the speed of the moving object in which the image capturing device 100 is installed is high. The error threshold is a specific value within a range of, for example, 3% or more and 20% or less.

Specifically, in this embodiment, in a case where a condition of multiple-exposure image capturing has been changed, the processing circuit 170 receives the first image that reflects the change. The processing circuit 170 uses the first image and distance information about the distance to the first subject to recalculate the estimated range of the speed of the moving object in which the image capturing device 100 is installed.

More specifically, in this embodiment, calculation of the estimated range by the processing circuit 170 and changing of a condition by the control circuit 120 in a case where error E is greater than the error threshold are repeated until the end condition is satisfied.

The processing circuit 170 outputs to the display device 160 the image and the estimated range of the speed of the moving object in which the image capturing device 100 is installed. The processing circuit 170 may be configured to output value V and error E to the display device 160. The processing circuit 170 outputs error E to the control circuit 120.

The display device 160 displays the image and the estimated range of the speed of the moving object in which the image capturing device 100 is installed. The display device 160 may be configured to display value V and error E.

The control circuit 120 controls image capturing conditions of the image capturing device 100. As in the first embodiment, the control circuit 120 can change a condition of multiple-exposure image capturing. The condition to be changed can include at least one selected from the group consisting of conditions (a) to (h) as in the first embodiment. The control circuit 120 controls image forming conditions of the image forming circuit 130.

In the fifth embodiment, the display device 160 is an internal display device of the image recognition apparatus 99. That is, the image recognition apparatus 99 includes the internal display device that displays the estimated range of the speed of the moving object in which the image capturing device 100 is installed. Specifically, the internal display device can display the first image and the estimated range. The internal display device may be configured to display value V and error E.

The image recognition apparatus 99 may include an output interface for outputting the estimated range to an external display device that displays the estimated range. Specifically, the image recognition apparatus 99 may include an output interface for outputting to an external display device the first image and the estimated range. The external display device may be a device that displays the first image and the estimated range. The output interface may be configured so as to output value V and error E. The external display device may be configured to display value V and error E.

The image recognition apparatus 99 may include either the internal display device or the output interface. The image recognition apparatus 99 may include both of them.

Also in the fifth embodiment, a condition of multiple-exposure image capturing and the first image are associated with each other as in the first embodiment.

Also in the fifth embodiment, the processing circuit 170 performs supervised learning using a plurality of combinations of one of teaching images and corresponding one of correct labels as in the first embodiment. A teaching image corresponds to the first image. A correct label corresponds to the speed of the moving object in which the image capturing device 100 is installed. The processing circuit 170 calculates the estimated range of the speed of the moving object in which the image capturing device 100 is installed using the first image after supervised learning. With the processing circuit 170 thus configured, the accuracy of calculation of the speed of the moving object in which the image capturing device 100 is installed can be easily ensured.

The other techniques described in the first embodiment are also applicable to the fifth embodiment.

Figure 20:
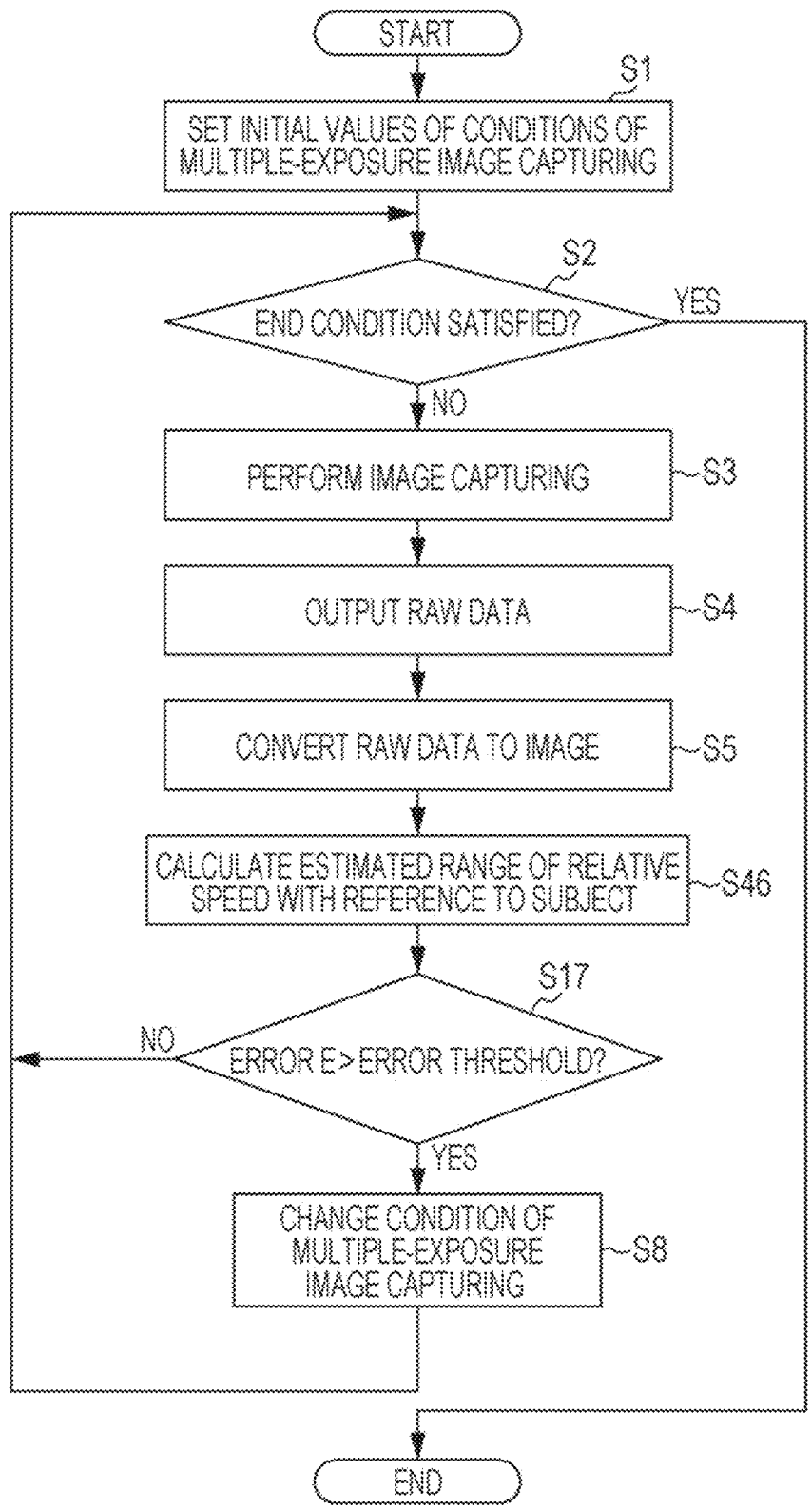
FIG. 20 is a flowchart illustrating control by the image recognition apparatus.

A Specific Example of the Way of Changing a Condition of Multiple-Exposure Image Capturing In the fifth embodiment, a condition of multiple-exposure image capturing can be changed in accordance with the flowchart illustrated in FIG. 20. The flowchart illustrated in FIG. 20 is described below. A description of part of the flowchart already given with reference to the flowchart in FIG. 12 may be omitted below.

In step S46, the processing circuit 170 identifies a stationary subject, such as a building or a sign, among subjects included in the image and calculates the estimated range of the speed of the moving object in which the image capturing device 100 is installed, the speed being determined with reference to the subject. There may be a case where the image used in this calculation is the first image obtained by performing multiple-exposure image capturing of the first subject. In this case, the processing circuit 170 uses the first image to calculate the estimated range of the speed of the moving object in which the image capturing device 100 is installed, the speed being determined with reference to the first subject. The processing circuit 170 outputs error E to the control circuit 120. After step S46, the flow proceeds to step S17.

In step S17, the control circuit 120 determines whether error E is greater than the error threshold. In a case where error E is greater than the error threshold, the flow proceeds to step S8. In a case where error E is less than or equal to the error threshold, the flow returns to step S2.

A first example of the end condition in step S2 in the fifth embodiment is the first example of the end condition in step S2 in the first embodiment.

A second example of the end condition in step S2 in the fifth embodiment is the second example of the end condition in step S2 in the first embodiment.

A third example of the end condition in step S2 is a condition that error E calculated most recently in step S46 is greater than the second upper threshold. In a case where error E is greater than the second upper threshold, the flow ends. In a case where error E is less than or equal to the second upper threshold, the flow proceeds to step S3. Typically, the second upper threshold is greater than the error threshold.

A fourth example of the end condition in step S2 is a condition that error E calculated most recently in step S46 is less than the second lower threshold. In a case where error E is less than the second lower threshold, the flow ends. In a case where error E is greater than or equal to the second lower threshold, the flow proceeds to step S3. Typically, the second lower threshold is less than the error threshold.

The flow may end in a case where the third example condition or the fourth example condition is satisfied. Otherwise, the flow may proceed to step S3.

A fifth example of the end condition in step S2 is a condition that a situation where error E calculated in step S46 is greater than the second upper threshold is successively determined the fourth threshold number of times. In a case where this situation is successively determined the fourth threshold number of times, the flow ends. Otherwise, the flow proceeds to step S3. This condition can be considered to be a condition that a frame that leads to the above-described situation successively appears the fourth threshold number of times.

A sixth example of the end condition in step S2 is a condition that a situation where error E calculated in step S46 is less than the second lower threshold is successively determined the fifth threshold number of times. In a case where this situation is successively determined the fifth threshold number of times, the flow ends. Otherwise, the flow proceeds to step S3. This condition can be considered to be a condition that a frame that leads to the above-described situation successively appears the fifth threshold number of times.

The flow may end in a case where the fifth example condition or the sixth example condition is satisfied. Otherwise, the flow may proceed to step S3. In this case, the fourth threshold number of times and the fifth threshold number of times may be the same or may be different from each other.

A seventh example of the end condition in step S2 in the fifth embodiment is the seventh example of the end condition in step S2 in the first embodiment.

A change in a condition of multiple-exposure image capturing according to the flowchart illustrated in FIG. 20 can increase the accuracy of calculation of the speed. This is described with reference to FIG. 21A and FIG. 21B. The example illustrated in FIG. 21A and FIG. 21B assumes that the above-described condition to be changed is the exposure interval.

FIG. 21A illustrates conditions of multiple-exposure image capturing for frame n and conditions of multiple-exposure image capturing for frame n+α, where n and a are natural numbers. FIG. 21A indicates that the exposure interval is changed from 2 ms to 4 ms in accordance with the flowchart illustrated in FIG. 20.

FIG. 21B illustrates value V and error E for frame n and value V and error E for frame n+α. For both frames, value V is 50 km/h. Error E for frame n is 15 km/h. Error E for frame n+α is 5 km/h. Error E for frame n+α is less than error E for frame n. FIG. 21B indicates that the accuracy of calculation of the speed of the moving object in which the image capturing device 100 is installed increases in accordance with the flowchart illustrated in FIG. 20.

Sixth Embodiment

Figure 22:
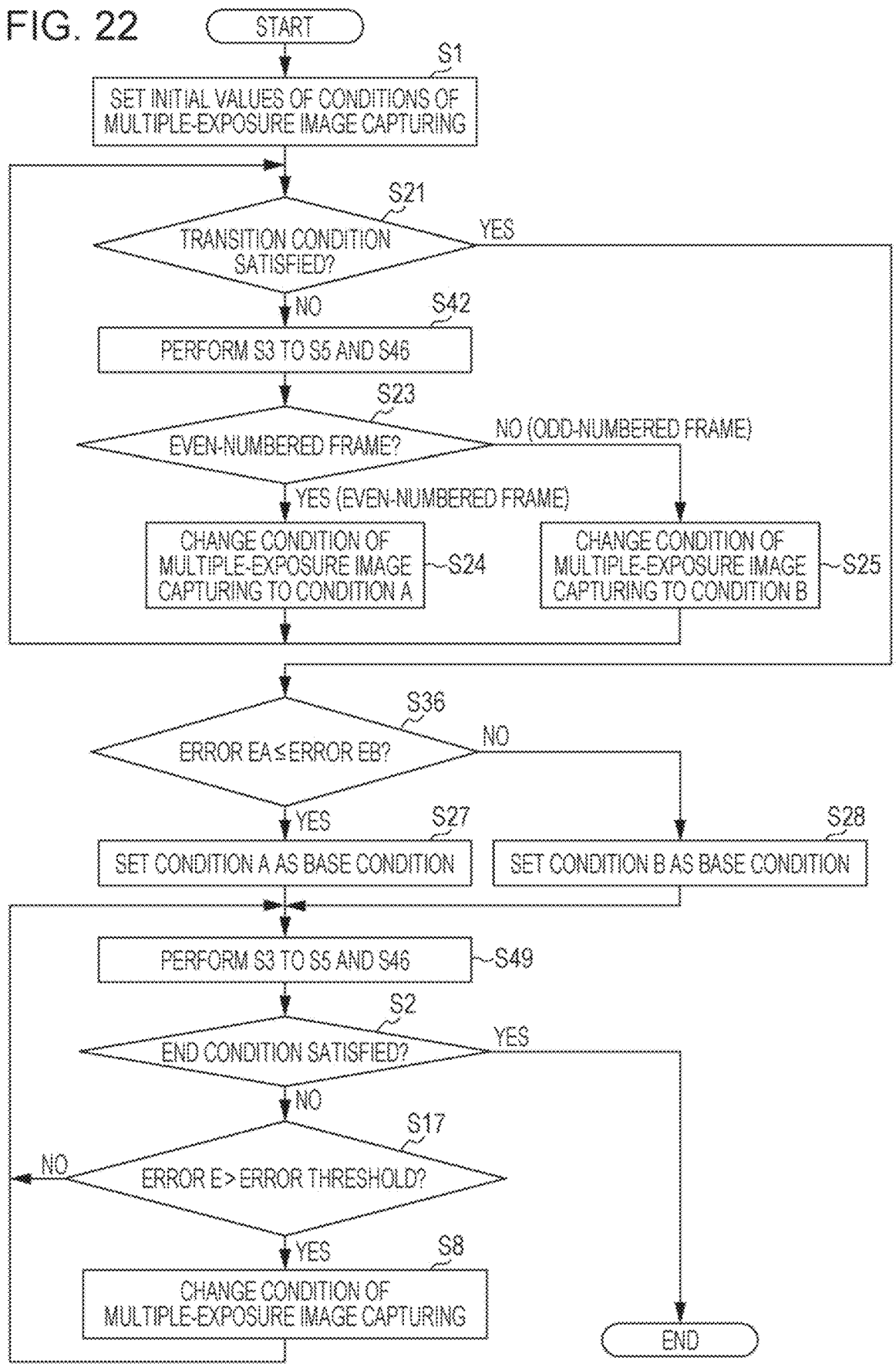
FIG. 22 is a flowchart illustrating control by the image recognition apparatus.

In a sixth embodiment, a condition of multiple-exposure image capturing can be changed in accordance with the flowchart illustrated in FIG. 22. The flowchart illustrated in FIG. 22 is described below. A description of part of the flowchart already given with reference to the flowcharts in FIG. 20 and/or FIG. 16 may be omitted below.

After step S1, the flow proceeds to step S21. In step S21, it is determined whether a transition condition is satisfied. A specific example of the transition condition will be described below. In a case where the transition condition is satisfied, the flow proceeds to step S36. In a case where the transition condition is not satisfied, the flow proceeds to step S42.

In step S42, steps S3, S4, S5, and S46 in FIG. 20 are performed in this order. After step S42, the flow proceeds to step S23.

In step S23, it is determined whether a frame for which calculation of the speed of the moving object in which the image capturing device 100 is installed has been performed in step S46 is an even-numbered frame or an odd-numbered frame counted since "start". In a case where the frame is an even-numbered frame, the flow proceeds to step S24. In a case where the frame is an odd-numbered frame, the flow proceeds to step S25.

In step S24, a condition of multiple-exposure image capturing is changed to condition A by the control circuit 120. After step S24, the flow returns to step S21.

In step S25, the condition of multiple-exposure image capturing is changed to condition B by the control circuit 120. After step S25, the flow returns to step S21.

In this specific example, the transition condition in step S21 is a condition that each of error EA and error EB has been obtained K times since "start", where K is a natural number. K is, for example, 1. Error EA is error E obtained when step S46 in step S42 is performed in a state where condition A has been employed in step S24. Error EB is error E obtained when step S46 in step S42 is performed in a state where condition B has been employed in step S25.

In step S36, error EA and error EB are compared with each other. In a case where error EA is less than or equal to error EB, the flow proceeds to step S27. In a case where error EA is greater than error EB, the flow proceeds to step S28.

In a case where the flow proceeds to step S27, condition A is set as a base condition. In a case where the flow proceeds to step S28, condition B is set as the base condition.

As understood from the above description, error EA and error EB are used when the base condition is set. Error EA and error EB can be referred to as errors E for reference.

After step S27 or step S28, in step S49, steps S3, S4, S5, and S46 in FIG. 20 are performed in this order.

In step S49, image capturing in step S3 is performed. In a case where condition A is set as the base condition, image capturing in step S49 performed for the first time is performed in a state where the condition of multiple-exposure image capturing is set to condition A. In a case where condition B is set as the base condition, image capturing in step S49 performed for the first time is performed in a state where the condition of multiple-exposure image capturing is set to condition B. After step S49, the flow proceeds to step S2.

In step S2, it is determined whether the end condition is satisfied as in the fourth embodiment. In a case where the end condition is satisfied, the flow ends. In a case where the end condition is not satisfied, the flow proceeds to step S17.

In step S17, the control circuit 120 determines whether error E is greater than the error threshold as in the fourth embodiment. In a case where error E is greater than the error threshold, the flow proceeds to step S8. In a case where error E is less than or equal to the error threshold, the flow returns to step S49.

In step S8, the condition of multiple-exposure image capturing is changed by the control circuit 120 as in the fourth embodiment. After step S8, the flow returns to step S49.

According to the flowchart illustrated in FIG. 22, in step S36, it is determined whether a smaller error E can be obtained by using condition A or condition B. In step S49, the condition with which a smaller error E can be obtained is used as the condition of multiple-exposure image capturing performed for the first time. This is advantageous from the viewpoint of quickly identifying a condition of multiple-exposure image capturing with which a smaller error E is obtained in step S49 and thereafter.

As described above, in the sixth embodiment, the processing circuit 170 calculates estimated ranges for a plurality of first images obtained by using different conditions to thereby calculate a plurality of errors E for reference. The control circuit 120 compares the plurality of errors E for reference with each other and selects a base condition that is a condition served as a base. The base condition is, for example, a condition with which the smallest error E is obtained among the above-described different conditions. The processing circuit 170 uses the first image that is obtained by using the base condition and that is different from the first images used to calculate the plurality of errors E for reference to calculate error E that is to be compared with the error threshold.

In the sixth embodiment, specifically, condition A and condition B are provided as conditions of multiple-exposure image capturing. Condition A is used to perform multiple-exposure image capturing of the first subject. The processing circuit 170 uses the first image obtained by using condition A to calculate error EA, which is error E. Condition B is used to perform multiple-exposure image capturing of the first subject. The processing circuit 170 uses the first image obtained by using condition B to calculate error EB, which is error E. The control circuit 120 compares error EA and error EB with each other. The control circuit 120 selects a base condition on the basis of the comparison. The base condition is a condition with which a smaller error E is obtained among condition A and condition B. The processing circuit 170 uses the first image that is obtained by using the base condition and that is different from the first images used to calculate error EA and error EB to calculate error E that is to be compared with the error threshold.

Thereafter, the processing circuit 170 uses the first image obtained by using the base condition to calculate the estimated range of the speed of the moving object in which the image capturing device 100 is installed. In a case where error E is greater than the error threshold, the control circuit 120 changes the condition of multiple-exposure image capturing. Specifically, in a case where the condition of multiple-exposure image capturing has been changed, the processing circuit 170 receives the first image that reflects the change. The processing circuit 170 uses the first image to recalculate the estimated range.

The image recognition apparatus according to the present disclosure can be used in various image recognition systems including autonomous driving vehicles, industrial robots, and consumer robots.

What is claimed is:

1. An image recognition apparatus comprising:
a processing circuit that receives a first image obtained by performing multiple-exposure image capturing of a first subject and that uses the first image to calculate a recognition accuracy of an object name of the first subject, the recognition accuracy of the object name of the first subject indicating a probability of the first subject being an object having the object name; and
a control circuit that changes a condition of the multiple-exposure image capturing in a case where the recognition accuracy is lower than a recognition accuracy threshold.

2. The image recognition apparatus according to claim 1, wherein
the condition that is changed in a case where the recognition accuracy is lower than the recognition accuracy threshold includes at least one selected from the group consisting of
(a) a length of each exposure period that is employed when the first image is obtained,
(b) a length of each exposure interval that is employed when the first image is obtained,
(c) the number of exposures that is employed when the first image is obtained,
(d) an exposure sensitivity of the first image,
(e) a gain of an image capturing device that is used to obtain the first image,
(f) a focal length of the image capturing device that is used to obtain the first image, (g) an aperture of the image capturing device that is used to obtain the first image, and (h) an output resolution of the first image.

3. The image recognition apparatus according to claim 1, further comprising at least one of an internal display device that displays the recognition accuracy or an output interface for outputting the recognition accuracy to an external display device that displays the recognition accuracy.

4. The image recognition apparatus according to claim 1, further comprising an image capturing device that is used to obtain the first image.

5. The image recognition apparatus according to claim 1, wherein the condition and the first image are associated with each other.

6. The image recognition apparatus according to claim 5, wherein as the condition associated with the first image, the condition that is retained in the control circuit is used.

7. The image recognition apparatus according to claim 5, further comprising an image capturing device that is used to obtain the first image, wherein as the condition associated with the first image, the condition that is retained in the image capturing device is used.

8. The image recognition apparatus according to claim 1, wherein the processing circuit performs supervised learning using a plurality of combinations of one of teaching images and corresponding one of correct labels, the teaching images each corresponding to the first image, the correct labels each corresponding to the object name of the first subject, and calculates the recognition accuracy using the first image after the supervised learning.

9. The image recognition apparatus according to claim 8, further comprising a second image capturing device that is used to obtain the teaching images.

10. The image recognition apparatus according to claim 8, wherein the processing circuit reads a computational model expressed by a neural network, and the processing circuit performs the supervised learning and calculates the recognition accuracy using the first image after the supervised learning.

11. The image recognition apparatus according to claim 1, wherein calculation of the recognition accuracy by the processing circuit and changing of the condition by the control circuit in a case where the recognition accuracy is lower than the recognition accuracy threshold are repeated until an end condition is satisfied.

12. The image recognition apparatus according to claim 1, wherein the processing circuit calculates a first recognition accuracy that is the recognition accuracy and that indicates a probability of the first subject being a first object and a second recognition accuracy that indicates a probability of the first subject being a second object, and the control circuit changes the condition of the multiple-exposure image capturing also in a case where a difference obtained by subtracting the second recognition accuracy from the first recognition accuracy is less than or equal to Z, Z being a value greater than or equal to zero.

13. The image recognition apparatus according to claim 1, wherein the processing circuit calculates recognition accuracies for a plurality of first images obtained by using different conditions to thereby calculate a plurality of recognition accuracies for reference, the control circuit compares the plurality of recognition accuracies for reference with each other and selects a base condition that is the condition served as a base, and the processing circuit uses a first image that is obtained by using the base condition and that is different from the first images used to calculate the plurality of recognition accuracies for reference to calculate the recognition accuracy that is to be compared with the recognition accuracy threshold.

14. The image recognition apparatus of claim 1, wherein the first image is a single image obtained by performing multiple-exposure image capturing of the first subject.

15. The image recognition apparatus of claim 1, wherein the first image is a single image obtained by forming a plurality of exposure periods in a frame period.

16. The image recognition apparatus of claim 1, wherein the object name comprises at least one of automobile, person, house, sign, or signal.

17. An image recognition apparatus comprising:

a processing circuit that receives a first image obtained by performing multiple-exposure image capturing of a first subject and that uses the first image to calculate an estimated range of a speed of the first subject, the estimated range being defined as $V \pm E$, where V is a center value of the estimated range and E is an error amount representing a deviation from the center value; and a control circuit that changes a condition of the multiple-exposure image capturing in a case where the error amount E is greater than an error threshold.

18. The image recognition apparatus of claim 17, wherein the error amount E is defined in percentage of the center value V.

19. The image recognition apparatus of claim 17, wherein the estimated range is defined as a range of the center value V-the error amount E or more and the center value V+the error amount E or less.

20. The image recognition apparatus of claim 17, wherein the first image is a single image obtained by performing multiple-exposure image capturing of the first subject.

21. The image recognition apparatus of claim 17, wherein the first image is a single image obtained by forming a plurality of exposure periods in a frame period.

22. An image recognition method comprising:

calculating a recognition accuracy of an object name of a] first subject by using a first image obtained by performing multiple-exposure image capturing of the first subject, the recognition accuracy of the object name of the first subject indicating a probability of the first subject being an object having the object name; and changing a condition of the multiple-exposure image capturing in a case where the recognition accuracy is lower than a recognition accuracy threshold.

23. An image recognition method comprising:

calculating an estimated range of a speed of a first subject by using a first image obtained by performing multiple-exposure image capturing of the first subject, the estimated range being defined as $V \pm E$, where V is a center value of the estimated range and E is an error amount representing a deviation from the center value; and changing a condition of the multiple-exposure image capturing in a case where the error amount E is greater than an error threshold.

24. The image recognition method of claim 23, wherein the error amount E is defined in percentage of the center value V.

25. The image recognition apparatus of claim 23, wherein the estimated range is defined as a range of the center value V−the error amount E or more and the center value V+the error amount E or less.

\* \* \* \* \*